US008041135B2

(12) United States Patent
Hosaki

(10) Patent No.: US 8,041,135 B2
(45) Date of Patent: Oct. 18, 2011

(54) IMAGE ENCODING APPARATUS AND CONTROL METHOD THEREOF

(75) Inventor: Kenta Hosaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1055 days.

(21) Appl. No.: 11/862,804

(22) Filed: Sep. 27, 2007

(65) Prior Publication Data

US 2008/0095455 A1 Apr. 24, 2008

(30) Foreign Application Priority Data

Oct. 20, 2006 (JP) ................................ 2006-286883
Oct. 20, 2006 (JP) ................................ 2006-286885

(51) Int. Cl.
*G06K 9/46* (2006.01)

(52) U.S. Cl. ........ 382/248; 382/243; 382/164; 382/166; 382/173

(58) Field of Classification Search .................. 382/248, 382/243, 176, 168, 233, 199, 266, 100; 707/203, 707/1
See application file for complete search history.

(56) References Cited

U.S. PATENT DOCUMENTS 5,848,185 A * 12/1998 Koga et al. .................... 382/173
5,848,857 A * 12/1998 Killworth et al. ............. 405/118
5,854,857 A * 12/1998 de Queiroz et al. ........... 382/232
5,949,555 A * 9/1999 Sakai et al. ................... 358/462
6,084,984 A * 7/2000 Ishikawa ....................... 382/173
6,272,255 B2 * 8/2001 de Queiroz et al. ........... 382/239
6,307,962 B1 * 10/2001 Parker et al. .................. 382/170
6,519,052 B1 * 2/2003 Oneda et al. ................. 358/1.16
7,133,565 B2 * 11/2006 Toda et al. .................... 382/243
7,386,168 B2 * 6/2008 Misawa ........................ 382/166
7,747,089 B2 * 6/2010 Mori ............................ 382/232
2005/0180645 A1 * 8/2005 Hasegawa et al. ............ 382/239
2006/0171587 A1 * 8/2006 Kanatsu ....................... 382/173

FOREIGN PATENT DOCUMENTS

JP 4-326669 11/1992

OTHER PUBLICATIONS

Timothy Arndt, "CIS 658 lecture note on JPEG Fall 2005,URL"www. cis.csuohio.edu/~arndt/jpeg.ppt, 39 Pages.*

* cited by examiner

*Primary Examiner* — Brian Q Le
*Assistant Examiner* — Mek Bekele
(74) *Attorney, Agent, or Firm* — Fitzpatrick, Cella, Harper & Scinto

(57) ABSTRACT

An apparatus and method encodes into block units an image in which halftone images and character and/or line images are mixed, and makes a substitution value, substituting for pixels in which pixels of a character and/or line image exist, a value whereby the occurrence of quantization errors of direct current components after frequency conversion is substantially zero, thereby minimizing block distortion of images when decoding. Therefore, a blocking unit inputs images in 8×8 pixel blocks. An acquisition unit acquires pixel data of character and/or line images as acquisition color information and acquires identification information identifying character and/or line image pixel positions. A substitution unit substitutes pixel data acquired as character and/or line images in image data of input blocks with a substitution value determined based on pixel data having halftone attributes.

11 Claims, 21 Drawing Sheets

FIG. 11A

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 0 | 1 | 1 | 1 |
| 0 | 0 | 0 | 0 | 1 | 1 | 1 | 0 |
| 0 | 0 | 0 | 1 | 1 | 1 | 1 | 0 |

FIG. 11B

| | | | | | | | |
|---|---|---|---|---|---|---|---|
| 254 | 255 | 255 | 254 | 253 | 252 | 255 | --------- |

F I G. 15
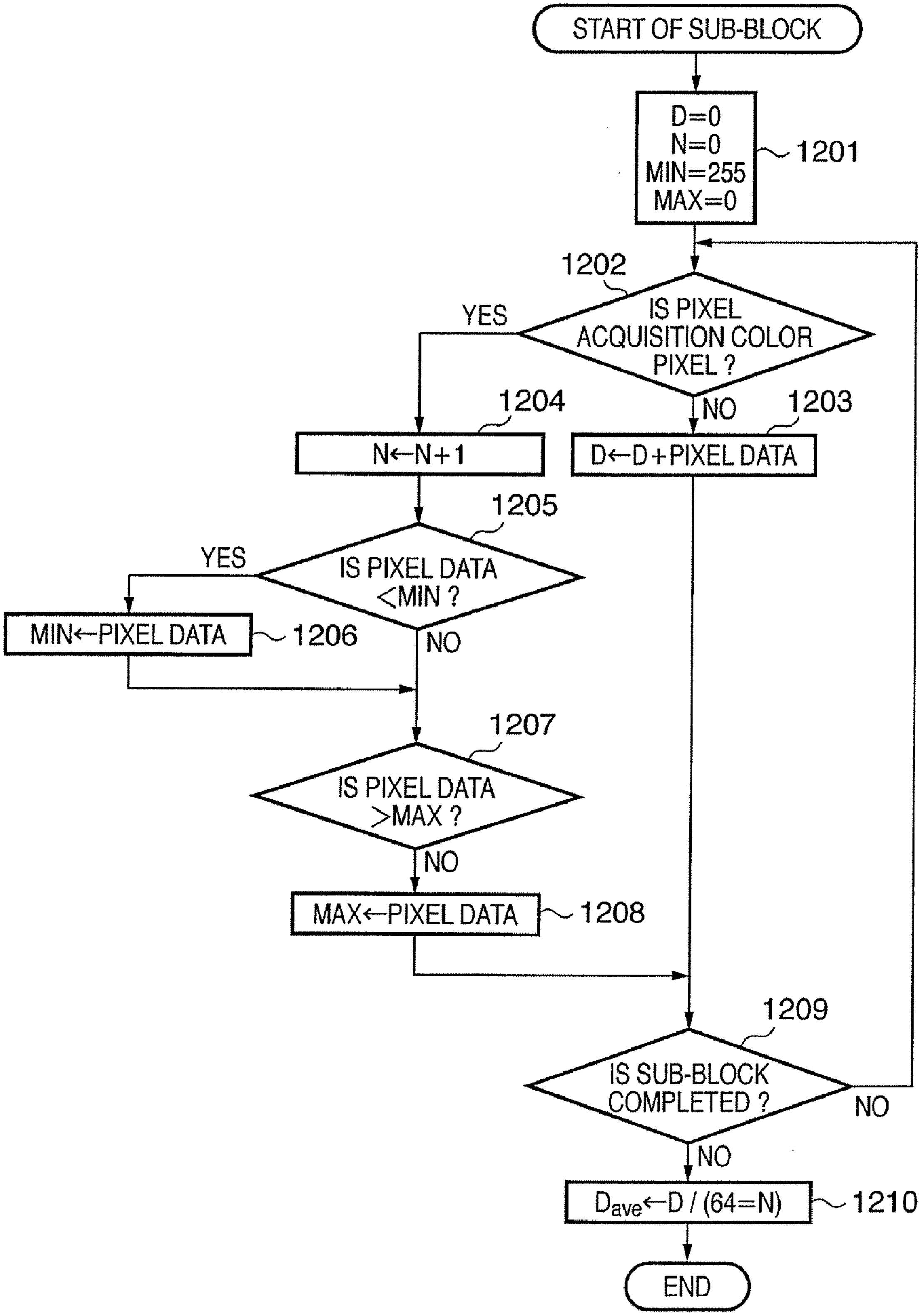

FIG. 17A

| | | | | | | | |
|---|---|---|---|---|---|---|---|
| 5 | 40 | 40 | 29 | 29 | 29 | 29 | 29 |
| 5 | 40 | 40 | 29 | 29 | 29 | 29 | 29 |
| 5 | 40 | 40 | 29 | 28 | 28 | 28 | 28 |
| 5 | 40 | 40 | 28 | 28 | 28 | 28 | 28 |
| 5 | 40 | 40 | 28 | 28 | 28 | 28 | 28 |
| 5 | 40 | 40 | 28 | 28 | 28 | 28 | 28 |
| 5 | 40 | 40 | 28 | 28 | 28 | 28 | 28 |
| 7 | 7 | 40 | 40 | 28 | 28 | 28 | 28 |

FIG. 17B

| | | | | | | | |
|---|---|---|---|---|---|---|---|
| 5 | 40 | 40 | 29 | 29 | 29 | 29 | 29 |
| 5 | 40 | 40 | 29 | 29 | 29 | 29 | 29 |
| 5 | 40 | 40 | 29 | 29 | 29 | 28 | 28 |
| 5 | 40 | 40 | 28 | 28 | 28 | 28 | 28 |
| 5 | 40 | 40 | 28 | 28 | 28 | 28 | 28 |
| 5 | 40 | 40 | 28 | 28 | 28 | 28 | 28 |
| 5 | 40 | 40 | 26 | 28 | 28 | 28 | 28 |
| 7 | 7 | 40 | 40 | 28 | 28 | 28 | 28 |

| | | | | | | | |
|---|---|---|---|---|---|---|---|
| 5 | 10 | 40 | 40 | 33 | 33 | 33 | 33 |
| 5 | 10 | 40 | 40 | 33 | 33 | 33 | 33 |
| 5 | 10 | 40 | 40 | 33 | 32 | 32 | 32 |
| 5 | 10 | 40 | 40 | 32 | 32 | 32 | 32 |
| 5 | 10 | 40 | 40 | 32 | 32 | 32 | 32 |
| 5 | 10 | 40 | 40 | 32 | 32 | 32 | 32 |
| 5 | 10 | 40 | 40 | 32 | 32 | 32 | 32 |
| 7 | 7 | 40 | 40 | 32 | 32 | 32 | 32 |

FIG. 17C

| | | | | | | | |
|---|---|---|---|---|---|---|---|
| 130 | 40 | 40 | 5 | 7 | 6 | 6 | 6 |
| 130 | 40 | 40 | 5 | 6 | 6 | 6 | 6 |
| 130 | 40 | 40 | 5 | 6 | 6 | 6 | 6 |
| 130 | 40 | 40 | 5 | 6 | 6 | 6 | 6 |
| 130 | 40 | 40 | 5 | 6 | 6 | 6 | 6 |
| 130 | 40 | 40 | 5 | 6 | 6 | 6 | 6 |
| 130 | 40 | 40 | 5 | 6 | 6 | 6 | 6 |
| 40 | 40 | 7 | 7 | 6 | 6 | 6 | 6 |

FIG. 17D

F I G. 18
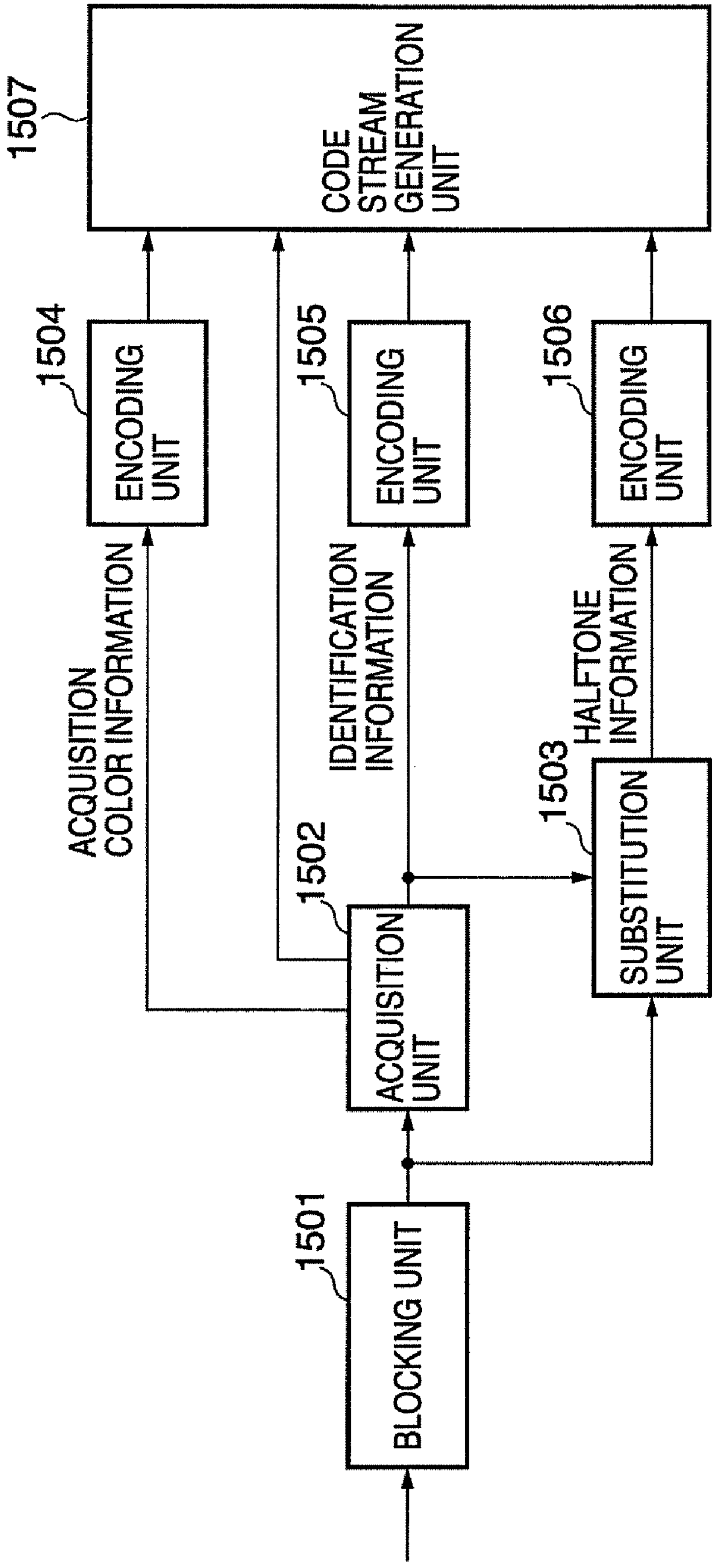

FIG. 20A

| | | | | | | | | | |
|---|---|---|---|---|---|---|---|---|---|
| 0 | 0 | 0 | 0 | 0 | 0 | 0 | 0 | | |
| 0 | 0 | 0 | 0 | 0 | 0 | 0 | 1 | | |
| 0 | 0 | 0 | 0 | 0 | 0 | 1 | 1 | | |
| 0 | 0 | 0 | 0 | 0 | 0 | 1 | 1 | | |
| 0 | 0 | 0 | 0 | 0 | 1 | 1 | 1 | | |
| 0 | 0 | 0 | 0 | 0 | 1 | 1 | 1 | | ---- |
| 0 | 0 | 0 | 0 | 1 | 1 | 1 | 0 | | |
| 0 | 0 | 0 | 1 | 1 | 1 | 1 | 0 | | |
| | | | | | | | | | |

FIG. 20B

| | | | | | | | |
|---|---|---|---|---|---|---|---|
| 254 | 255 | 255 | 254 | 253 | 252 | 255 | --------- |

IMAGE ENCODING APPARATUS AND CONTROL METHOD THEREOF

BACKGROUND OF THE INVENTION

1. Field of the Invention

The present invention relates to technology that compression-encodes image data.

2. Description of the Related Art

JPEG encoding may be mentioned as a known conventional method for encoding an image. JPEG encoding encodes blocks of 8×8 pixels in image data in units. It is assumed that all the processing described hereunder is executed taking this size block as a unit.

First, a discrete cosine transformation (DCT) is performed for input blocks to obtain 8×8 discrete cosine transform coefficients. Next, the discrete cosine transform coefficients are subjected to quantization using a quantization table. In this case, the value of an element of the quantization table is called a "quantization step width." A quantization step width increases in size for discrete cosine transform coefficients of high frequency components. Quantization is performed by dividing the discrete cosine transform coefficients by the respectively corresponding quantization step width and rounding off fractional portions to the nearest integer. Consequently, the values after quantization become small with respect to high frequency components, and the occurrence frequency of zero increases. Next, separate encoding is performed for one direct current (DC) component and 63 alternating current (AC) components after quantization.

With respect to the DC component, Huffman coding is performed after executing differential predictive coding since the inter-block correlation is strong. Differential predictive coding is a method that encodes a difference with the immediately preceding value. Huffman coding is an encoding technique that assigns a short code to values with a high occurrence frequency and assigns a long code to values with a low occurrence frequency to ultimately shorten the overall code length.

For the AC components, Huffman coding is performed after performing run-length encoding. Run-length encoding is an encoding method in which the encoding rate increases proportionally to the continuation of one specific value. By performing zigzag scanning for the values after quantization, the encoding efficiency is improved by making a succession of 0 values of high frequency components.

As will be understood from the fact that JPEG encoding is employed in devices such as digital cameras, JPEG encoding is a favorable compression method for natural images. On the other hand, for images including characters or image lines, there is a problem that mosquito noise, caused by loss of high frequency components of an image, or block distortion caused by loss of high frequency components or a quantization error for a DC component, is likely to occur. For this reason, as a method for compressing image data with the resolution of a character or line image or the like maintained as it is, the image is divided into blocks as discrete cosine transform units. Thereafter, resolution information such as a character or line image of a previously designated color or density value is acquired in block units, and halftone information obtained by performing substitution processing at an appropriate value for the acquired region is encoded by discrete cosine transformation or the like. On the other hand, a method that encodes color information in block units by predictive coding or the like has been proposed.

In this case, an image is assumed to be a synthesized image of a natural image having relatively few high frequency components and a character or line image as binary-like information which locally has the same density value. In order to protect character or line image information from signal distortion generated upon compression/expansion of the image using discrete cosine transform encoding, the character and/or line image binary information is acquired in advance, and lossless encoding that is free from deterioration is performed for the binary information.

For example, Japanese Patent Application Laid-Open No. 4-326669 describes a method in which, for substitution processing to an acquisition region, substitution processing is performed that refers to a region other than the acquisition region within a block. More specifically, the average of a region other than the acquisition region is calculated by an average calculation unit, and substitution processing is performed with respect to the acquisition region using the obtained average. Alternatively, a method has been disclosed in which input pixels are delayed by one cycle, and substitution is performed with respect to the pixels of an acquisition region with the delayed pixels. With this kind of method, a spectrum after discrete cosine transformation is concentrated in a low frequency region and an effect is obtained that suppresses image quality deterioration after compression/expansion.

However, in the above described conventional image processing methods, the problem remains that when quantization step widths used when performing quantization after discrete cosine transformation are coarse, the possibility of a quantization error occurring is high, and that quantization error is one factor that causes block distortion in the image.

Further, when encoding a direct-current component value among the coefficients after discrete cosine transformation, encoding of the differential between the direct-current component value of the block of interest and the direct-current component value of the preceding block is performed. Because the direct current components of two blocks in a halftone image that does not include a character and/or line image are substantially the same value, that differential will be a small value, and the encoding efficiency is high.

However, if we focus on two neighboring blocks in a region that includes a character and/or line image on a halftone image, we find that in this case it is, instead, rare for the number of pixels of the character and/or line image included in the respective blocks to be the same, and inevitably the possibility that the difference between the direct current components of the two blocks will be zero is low. That is, the encoded data length of the direct current component is not minimized, and ample room for improvement remains.

SUMMARY OF THE INVENTION

The present invention has been made in consideration of the above problems, and has as its object to provide technology that suppresses the occurrence of block distortion and realizes efficient encoding of images in which halftone images and character and/or line images are mixed.

In order to achieve the above object, for example, an image encoding apparatus according to the present invention comprises the following structure. That is, according to the present invention there is provided an image encoding apparatus comprising:

an input unit that inputs a block image consisting of a plurality of pixels;

a substitution unit that substitutes a value of a pixel corresponding to a partial image in the block image with a different value;

a conversion unit that generates a direct current component and alternating current components by subjecting a block image on which the substitution is executed to frequency conversion;

a quantization unit that quantizes the direct current component; and an encoding unit that encodes the direct current component and the alternating current components;

wherein the substitution unit performs the substitution according to a direct current component that is quantized in accordance with pixels other than pixels of the partial image in the block image.

According to the present invention, when encoding into block units an image in which a halftone image and a character and/or line image are mixed, since a substitution value that substitutes for pixels in which pixels of a character and/or line image exist is made a value that makes the occurrence of a direct current component after frequency conversion substantially zero, block distortion can be minimized.

Further features of the present invention will become apparent from the following description of exemplary embodiments (with reference to the attached drawings).

BRIEF DESCRIPTION OF THE DRAWINGS

FIGS. 11A and 11B are views that show an example of acquisition color information and identification information generated by the acquisition unit shown in FIG. 9;

FIG. 15 is a flowchart for describing the contents of processing of a target value calculation unit according to the third embodiment;

FIGS. 17A to 17D are views that show an example of processing results of the substitution value generation unit;

FIG. 18 is a block configuration diagram of an image encoding apparatus according to the third embodiment;

FIGS. 20A and 20B are views showing an example of acquisition color information and positional information generated by an acquisition unit according to the third embodiment.

DESCRIPTION OF THE EMBODIMENTS

The embodiments of the present invention will be described hereinafter with reference to the accompanying drawings.

First Embodiment

Figure 9:
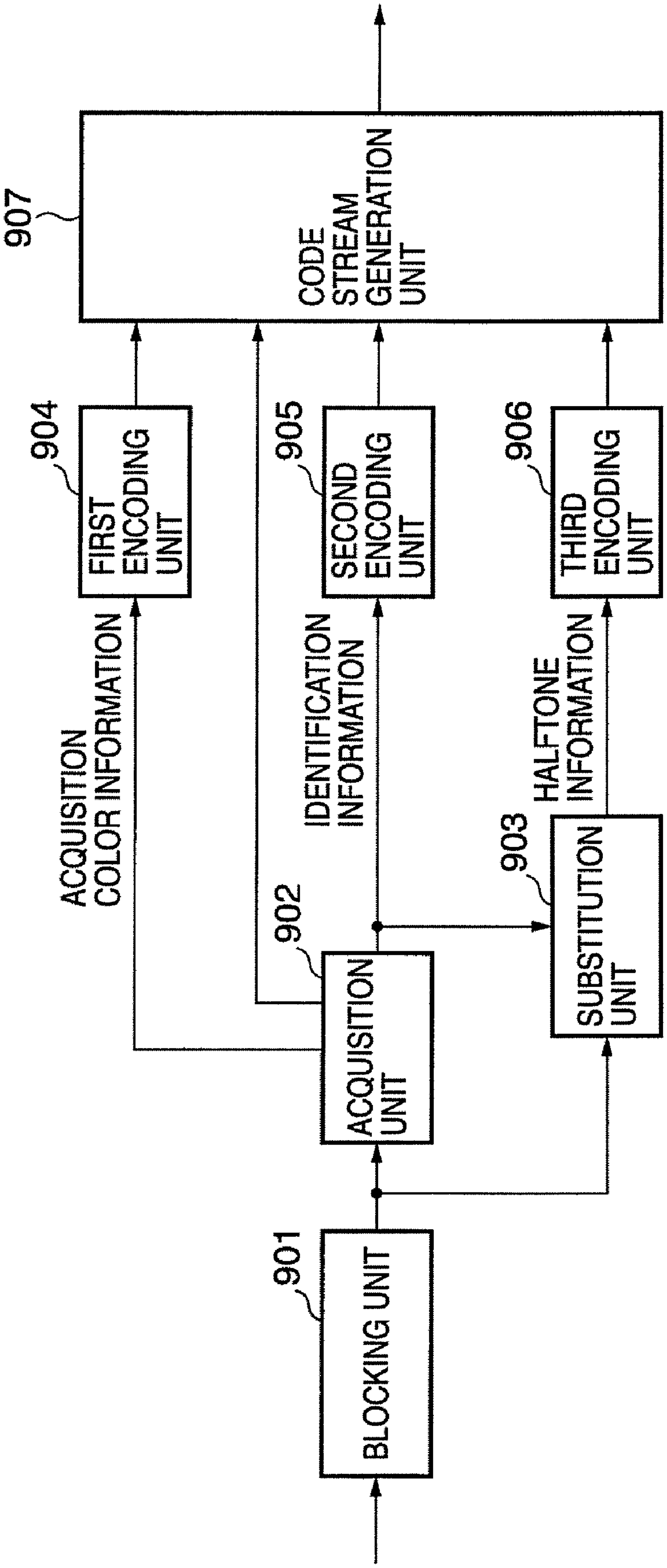
FIG. 9 is a block configuration diagram of an image encoding apparatus according to the present embodiment.

FIG. 9 is a block configuration diagram of an image encoding apparatus according to the embodiments. In the figure, at a blocking unit 901, image data as an encoding object is input, and blocks consisting of 8×8 pixels are output in units from that image data. An acquisition unit 902 determines an acquisition color by a predetermined method from the blocked image, and outputs information indicating that acquisition color as acquisition color information. The acquisition unit 902 also outputs identification information that identifies whether each pixel in a block is a pixel having the acquisition color or a pixel of a non-acquisition color.

A substitution unit 903 performs substitution processing with respect to pixels of an acquisition color region based on the identification information that is input, and outputs the results as halftone information. A first encoding unit 904 subjects the acquisition color information that is input to lossless compression and outputs the resulting data. A second encoding unit 905 subjects the input identification information to lossless compression and outputs the resulting data. A third encoding unit 906 subjects the input halftone information to lossy compression (JPEG encoding in this embodiment) and outputs the resulting data. Next, a code stream generation unit 907 synthesizes the encoded data that is generated at each encoding unit, and generates and outputs an encoded data stream in block units.

To simplify the description, for the image data that is the encoding object in the present embodiment, one pixel is represented by one component, and one pixel is taken as an 8-bit (256 gradations) image (grayscale image). Further, the value 255 is described as black, and the value 0 is described as white. That is, pixel values are described as an indication of density. However, this is one example, and the present invention is not limited thereto.

First, the acquisition unit 902 according to this embodiment is described.

Figure 10A:
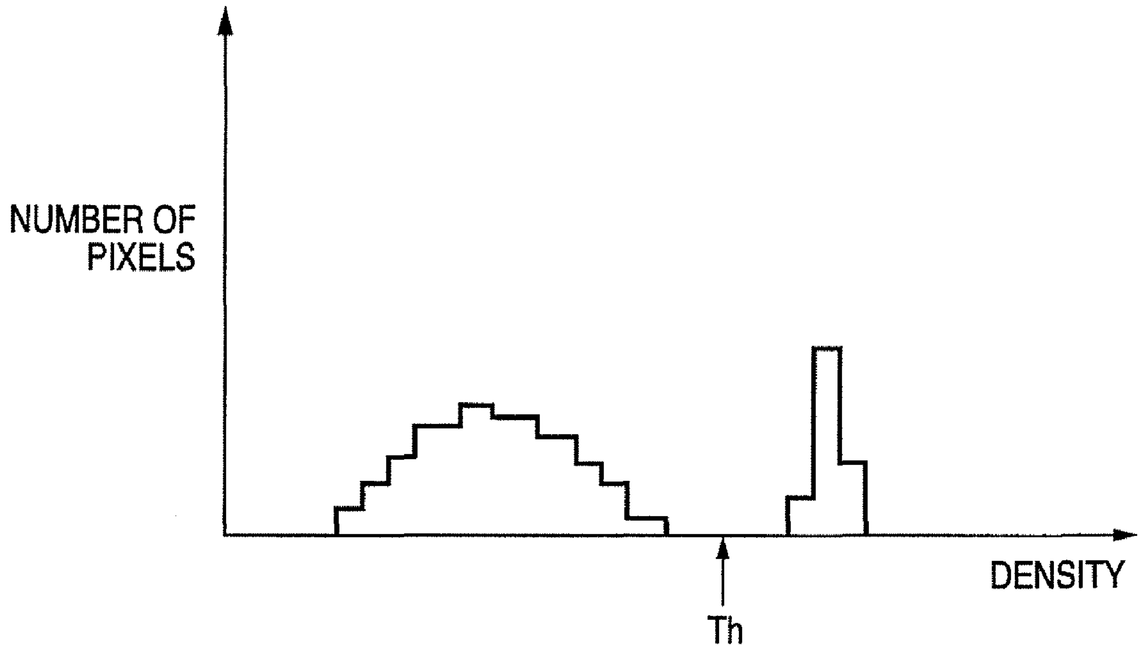
FIGS. 10A and 10B are views for describing the contents of processing of an acquisition unit shown in FIG. 9.
Figure 10B:
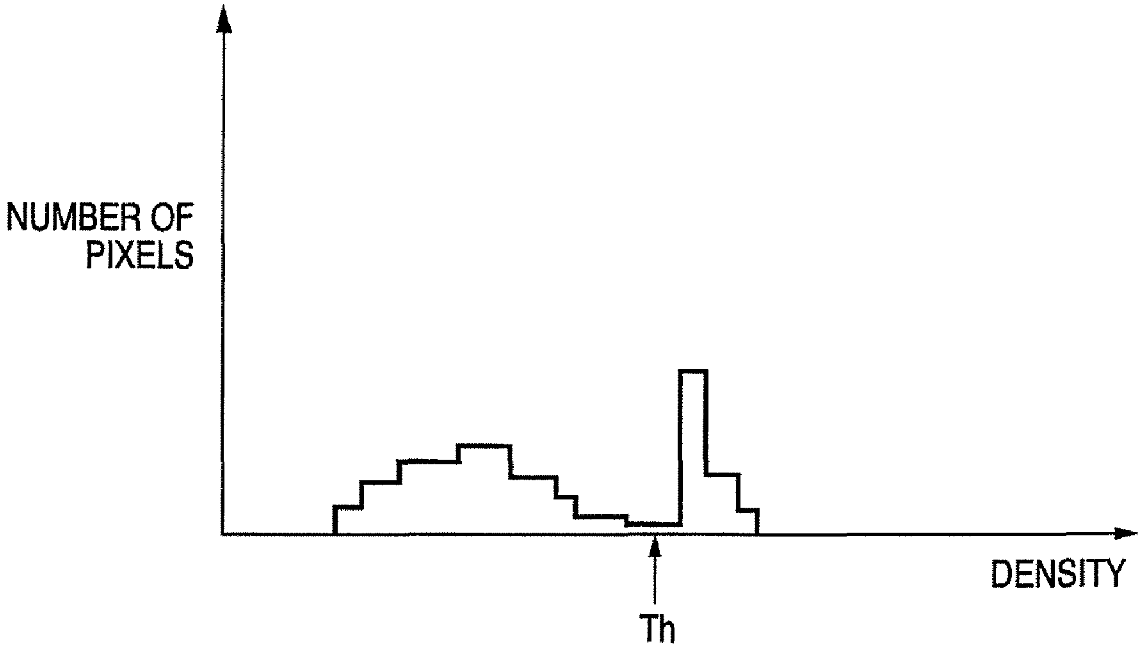

When a character and/or line image that is black or close to black is present in a natural image or a CG (computer graphic) gradation image, a histogram of the density of the blocks thereof will appear as shown in FIGS. 10A and 10B. FIG. 10A is a view that shows a case in which the density of a character and/or line image has a value that is sufficiently different from the density of the background (natural image or CG gradation image). This situation is exactly a situation in which it is possible to clearly distinguish and recognize the character and/or line image from the background image. FIG. 10B illustrates a case in which the character and/or line image and background can be distinguished to an acceptable degree, although not to the same extent as in FIG. 10A. In either case, since two frequency peaks appear, the position of the minimum value between the two peaks is determined as a threshold Th. In this connection, in the case shown in FIG. 10A, threshold Th may be at any position as long as it is a position at which there is no frequency between the two peaks.

The acquisition unit 902 decides the threshold Th as described above, and determines a pixel having a value that exceeds the threshold Th to be a pixel that has an acquisition color. Subsequently, in order to identify pixel positions that have the acquisition color and pixel positions that have a non-acquisition color, the acquisition unit 902 binarizes the input 8×8 pixels using the threshold Th and outputs the result as identification information to the encoding unit 905 and the substitution unit 903. The binarization is performed by taking a pixel value that exceeds the threshold as "1" and taking a pixel value that is equal to or less than the threshold as "0". FIG. 11A is a view showing this identification information.

The acquisition unit 902 performs raster scanning of the 8×8 pixels, acquires input pixel values for which the identification information is "1" in sequential order, aligns the pixel values in a one-dimensional manner as shown in FIG. 11B, and outputs those pixel values as acquisition color information to the encoding unit 904.

When the image data that is the encoding object is image data that is optically read with an image scanner or the like, each pixel of a character and/or line image will not necessarily be a single color due to the reading accuracy and the like. Accordingly, as shown in FIG. 11B, although the values will be varied to some degree, the degree of variance is small. Therefore, according to the present embodiment, the encoding unit 904 employs lossless encoding that, for example, utilizes predictive coding.

When encoding image data that is output directly from a computer without using an image scanner or an image that is rendered in accordance with print data from a computer, a character and/or line image will be a single color since errors do not occur. Therefore, in this case, since pixels that exceed the threshold all have the same value, the acquisition color information is one piece of data. In this case, it is sufficient for the encoding unit 904 to encode only that one piece of data. Further, when it is judged that the degree of variance is small even when the data has been read with a scanner or the like, it is sufficient to select one represented value (for example, median value) and encode that value.

Since the identification information is 8×8 pieces of binary data as shown in FIG. 11A, it is sufficient for the encoding unit 905 to perform lossless encoding (predictive coding, run-length encoding or the like) that is specific to binary data.

When there is only one frequency peak with respect to the density within a block, in other words, when an acquisition color region does not exist within a block, the acquisition unit 902 outputs all the bits of the identification information as "0". At this time, the acquisition unit 902 outputs a signal indicating that there is no acquisition color information within the block of interest to the code stream generation unit 907. Further, when an acquisition color region exists within a block, the acquisition unit 902 outputs a signal indicating that there is acquisition color information to the code stream generation unit 907.

In contrast, the encoding unit 906 according to this embodiment performs JPEG (lossy) encoding. JPEG encoding is encoding technology that is stored in digital cameras and the like, and is known as having a high compression ratio with respect to natural images. JPEG is technology that utilizes the fact that human vision is insensitive to high frequency components, and encodes data after removing the high frequency components to some degree to reduce the information amount. However, for character and/or line images and the like it is desirable that the edges thereof are distinct. In other words, it can be said that it is desirable to maintain high frequency components in character and/or line images.

In this regard, according to the present embodiment character and/or line images portions are subjected to lossless encoding by the encoding units 905 and 904 and, theoretically, can be completely restored to their original values.

JPEG encoding generates encoded data by executing DCT transformation (discrete cosine transformation), quantization, and entropy encoding processing on 8×8 pixel blocks. When a block that includes a character and/or line image undergoes DCT transformation, the influence of the presence of the character and/or line image is evident in the obtained conversion coefficients. Further, in the quantization processing, although quantization is performed in quantization steps that are larger for conversion coefficients of high frequency components, even in that situation the high frequency components must not be cut out completely. This is because if quantization steps are used that are large enough to completely cut out high frequency components, the image quality will be degraded even though the image is a natural image.

Therefore, according to the present embodiment, when performing JPEG encoding for a block in which a character and/or line image exists, a block that is equivalent to a block in which a character and/or line image does not exist for that block is generated, and JPEG encoding is performed at the encoding unit 906. The substitution unit 903 shown in FIG. 9 implements this processing.

Hereunder, the substitution unit 903 according to this embodiment is described.

Figure 1:
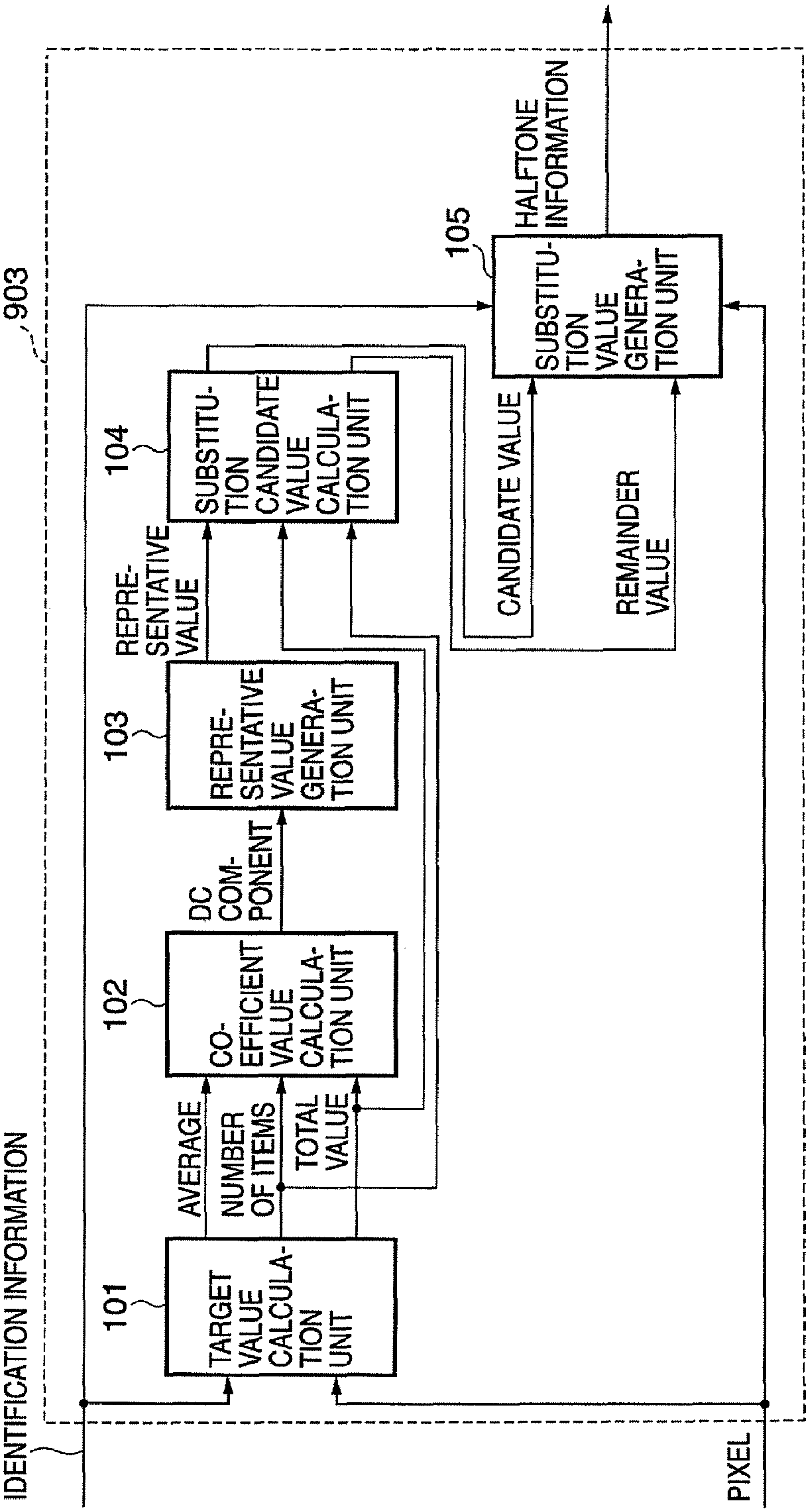
FIG. 1 is a block configuration diagram of a substitution unit according to the first embodiment of the present invention.

FIG. 1 is a detailed block diagram of the substitution unit 903 according to the present embodiment. The substitution unit 903 includes a target value calculation unit 101, a coefficient value calculation unit 102, a representative value generation unit 103, a substitution candidate value calculation unit 104, and a substitution value generation unit 105.

Based on the identification information and pixel data of the block that is input, the target value calculation unit 101 calculates a total value D of the values of pixels excluding pixels having an acquisition color, an average $D_{ave}$ of the values of pixels excluding pixels having an acquisition color, and a number N of pixels that are judged as having an acquisition color. That is, the total value D is the total value of pixels of the non-acquisition colors and the average $D_{ave}$ is the average of the non-acquisition colors.

This will now be described to clarify the situation in advance. When the number N of pixels that are judged as the acquisition color is 0, the processing described hereunder is not performed, and the substitution value generation unit 105 outputs the input pixel values as they are to the encoding unit 906. Hereunder, attention should be paid to the fact that the description is for a case in which N is a value other than 0. Further, instead of the number of pixels judged as an acquisition color, the number of pixels may be the number of pixels judged as a non-acquisition color. This is because the relationship "number of pixels judged as an acquisition color=64−number of pixels judged as a non-acquisition color" exists, and calculation of one of the values for number of pixels is equivalent to calculating the other value for the number of pixels.

The value of a pixel at coordinates (i,j) among the 8×8 pixels is represented by $X_{ij}$, and the 8×8 pieces of identification information are denoted as $T_{ij}$. In this case, $T_{ij}$ is either of values "0" and "1". When $T_{ij}=1$, a pixel $X_{ij}$ refers to a pixel that is judged as a pixel having an acquisition color, i.e. a character and/or line image. When $T_{ij}=0$, a pixel $X_{ij}$ refers to a pixel that is judged as a pixel having a non-acquisition color, i.e. a natural image (or background image). Accordingly, the total value D, average $D_{ave}$, and number N are calculated as follows. Further, i and j are integers between 0 and 7.

$$N=\Sigma\Sigma T_{ij}$$

$$D=\Sigma\Sigma X_{ij}\times(1-T_{ij})$$

$$D_{ave}=D/(64-N)$$

Where, ΣΣ represents the total of i,j=0, 1, 2 . . . 7.

Figure 2:
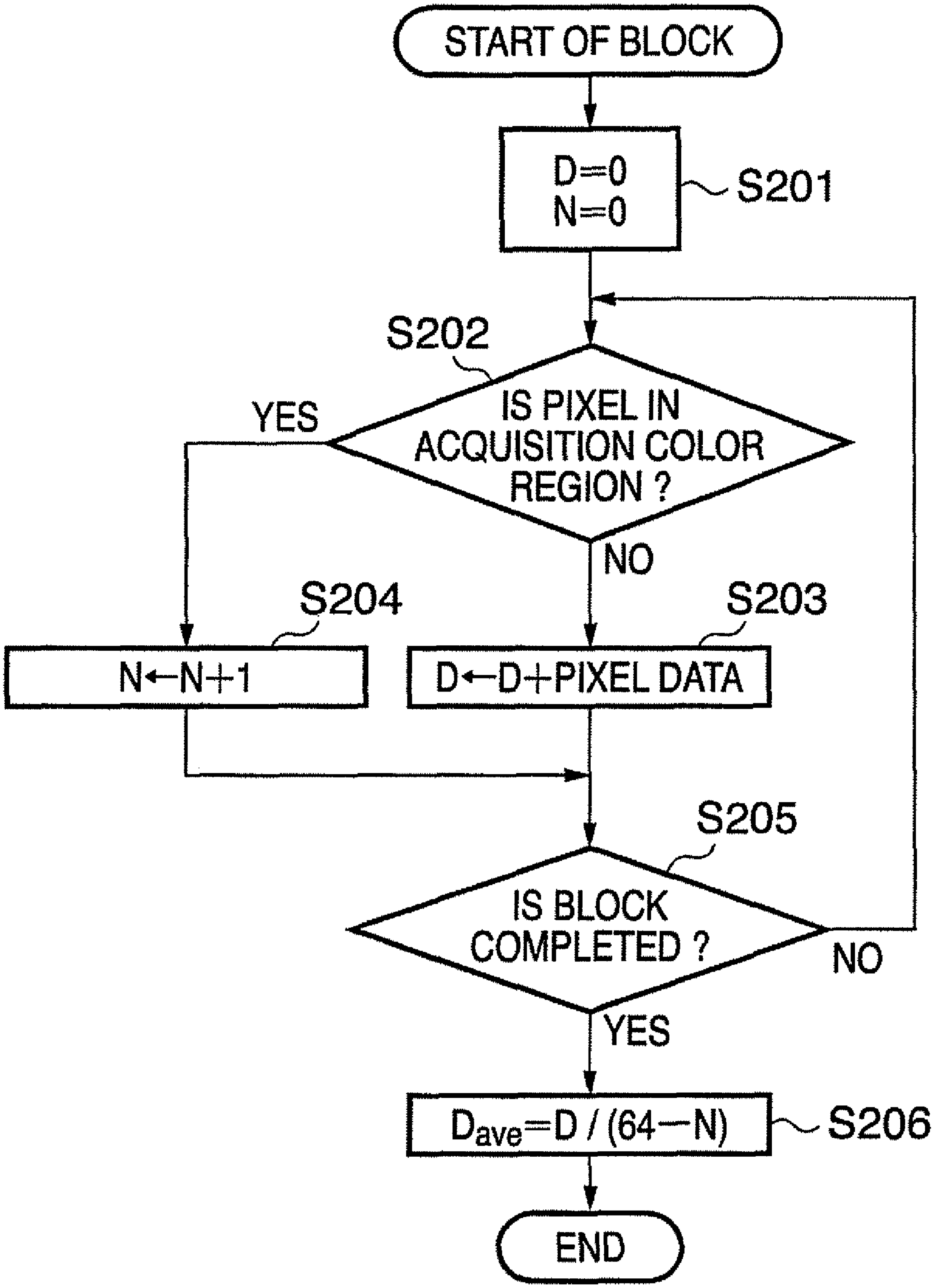
FIG. 2 is a flowchart for describing the contents of processing of a target value calculation unit according to the first embodiment.

FIG. 2 is a flowchart that illustrates the specific processing procedures of the target value calculation unit 101. Hereunder, those processing procedures are described in accordance with FIG. 2.

First, in step S201, a variable D that determines a total value and a variable N that determines the number of items are respectively initialized to 0.

Next, in step S202, based on the identification information, the target value calculation unit 101 determines whether or not the pixel of interest is a pixel inside an acquisition color region, that is, whether or not the pixel of interest is a pixel that has an acquisition color. When it is determined that the pixel of interest is a pixel inside an acquisition color region, the processing advances to step S204 and the variable N is incremented by "1". In contrast, when it is determined that the pixel of interest is a pixel of a non-acquisition color region, the processing advances to step S203 and the value of the pixel of interest data is added to the variable D.

Upon performing the processing of either step S203 or step S204, the processing advances to step S205 to determine whether or not processing has been performed for all of the pixels (64 pixels) in the block. If all the pixels have not been processed, the target value calculation unit 101 repeats the processing of step S202 onward to perform processing for the next pixel.

When it is determined at step S205 that processing was performed for all the pixels in the block, the processing advances to step S206 to determine the average $D_{ave}$ of pixels in non-acquisition color regions based on the values D and N that are determined as described above.

Next, the coefficient value calculation unit 102 will be described. The coefficient value calculation unit 102 calculates a DC coefficient that is a direct current component obtained by DCT transformation based on the total value D, average $D_{ave}$, and number N that are output by the target value calculation unit 101.

Generally, when a pixel value is taken as $X_{ij}$ and a coefficient obtained by transformation is taken as $Y_{u,v}$, DCT transformation performs the following operation.

$$Y_{u,v}=(1/4)\alpha(u)\alpha(v)\Sigma\Sigma(X_{ij}-128)\cos((2i+1)u\pi/16)\cos((2j+1)v\pi/16)$$

Here, only in the case of determining the direct current component DC, both u and v are "0", and α(0) is 1/√2. Thus, the direct current component DC after DCT transformation is as shown in the following formula (1).

$$DC=Y_{0,0}=(1/8)\Sigma\Sigma(x_{ij}-128) \quad (1)$$

The substitution unit 903 according to the present embodiment performs substitution so that the values of pixels judged to have an acquisition color inside the block have the average $D_{ave}$ of pixels judged as a non-acquisition color. Therefore, the coefficient value calculation unit 102 changes the above described formula (1) to obtain the following formula (2) using the values D, $D_{ave}$, and N that are calculated by the target value calculation unit 101, calculates a provisional DC component, and outputs that value to the representative value generation unit 103.

$$DC=\{\text{total value of pixels of non-acquisition color region}+(\text{average of pixels of non-acquisition color region}*\text{number of pixels inside acquisition color region})-128\times 64\}/8=(D+D_{ave}\times N-128\times 64)/8 \quad (2)$$

As described in the foregoing, in JPEG, each coefficient that is obtained by DCT transformation is quantized. In this case, the quantization step value of a DC component for quantization performed at the encoding unit 906 according to the present embodiment is described as "16". Normally, since values below the decimal level occur when quantization is performed, rounding off fractional portions to the nearest integer is performed.

Therefore, after adding "8" (half the value of the quantization step) to the DC component value that is calculated by the coefficient value calculation unit 102, the representative value generation unit 103 according to the present embodiment makes the low order four bits "0". As a result, the DC component value that is calculated by the coefficient value calculation unit 102 can be made an integral multiple of the quantization step, and errors occurring in quantization processing performed by the encoding unit 906 can substantially be made zero. That is, the representative value generation unit 103 changes the DC component value that is calculated by the coefficient value calculation unit 102 to a value that is approximate to the DC component value and is an integral multiple of the quantization step. The representative value generation unit 103 outputs the resulting value as a quantization representative value to the substitution candidate value calculation unit 104.

Next, the substitution candidate value calculation unit 104 is described.

The quantization representative value that the representative value generation unit 103 generates is expressed as $D_p$. When the value of a pixel in an acquisition color region is taken as Z, referring to formula (2), it is necessary that $D_p$ and Z satisfy the following formula (3).

$$D_p=(D+Z\times N-128\times 64)/8 \quad (3)$$

By performing an inverse operation for formula (3), the pixel value Z inside an acquisition color region can be determined by the following formula (4).

$$Z=\{8\times D_p-D-128\times 64\}/N=\{8\times\text{quantization representative value}-\text{total value of pixels of non-acquisition color region}-128\times 64\}/\text{number of pixels judged as being in acquisition color region} \quad (4)$$

That is, by making the value of each pixel that is judged to have an acquisition color a value that is determined by formula (4), an error does not occur in a DC component when quantization is performed at the encoding unit 906 at a subsequent stage. However, the pixel value must be an integer. That is, if the values are left as they are, a remainder value (surplus) produced by formula (4) will be ignored.

Thus, this remainder value R is determined by the following formula (5) ([A % B] is taken as a function that returns the surplus when an integer A is divided by an integer B).

$$R=\{8\times D_p-D-123\times 84\}\ \%\ N \quad (5)$$

The substitution candidate value calculation unit 104 outputs the remainder value R and the value Z (candidate value) to the substitution value generation unit 105.

Based on the identification information, the remainder value R, and the candidate value Z, the substitution value generation unit 105 generates pixel data for one block that is input, and outputs the pixel data to the encoding unit 906. More specifically, when the substitution value generation unit 105 determines based on the identification information that the pixel of interest is in a non-acquisition color region, it outputs the value for that pixel as it is to the encoding unit 906. Further, when the substitution value generation unit 105 determines based on the identification information that the pixel of interest is in an acquisition color region, it outputs the candidate value Z or a value equal to the candidate value Z+1 as the value of that pixel to the encoding unit 906.

Figure 3:
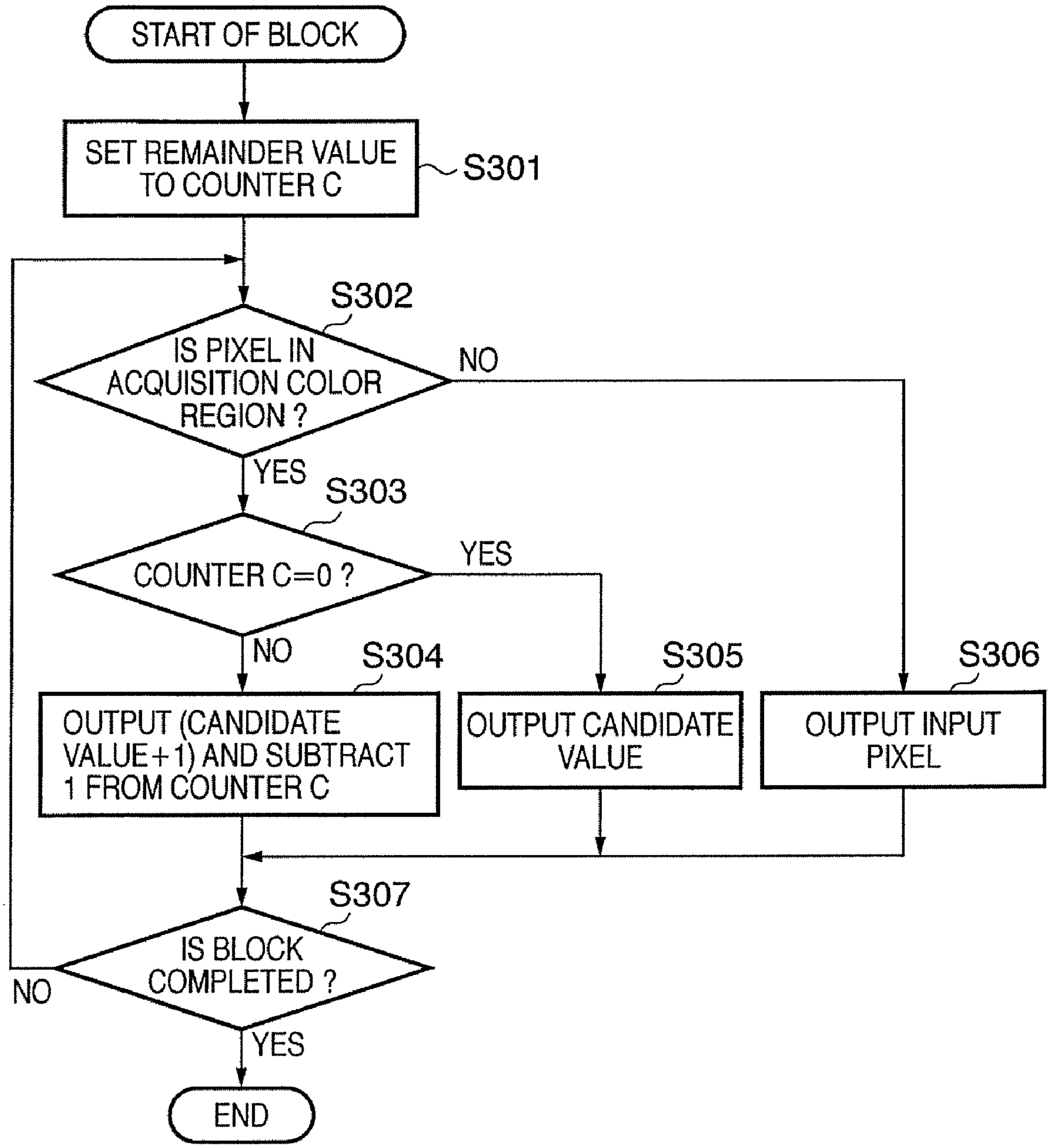
FIG. 3 is a flowchart for describing the contents of processing of a substitution value generation unit according to the first embodiment.

An example of the contents of processing of the substitution value generation unit 105 will be described in accordance with the flowchart shown in FIG. 3. In the following description, the raster scanning direction is described as a direction of updating pixel positions.

First, in step S301, the remainder value R is set as the initial value of a counter C.

Next, in step S302, the substitution value generation unit 105 determines whether or not the pixel of interest is in an acquisition color region. When it is determined that the pixel of interest is in a non-acquisition region, the process advances to step S306 to output the input pixel data as it is.

On the other hand, when it is determined at step S302 that the pixel of interest is in an acquisition color region, the processing advances to step S303 to determine whether or not the counter C is "0". If the result is NO, the operation advances to step S304. At step S304, "Z+1" is output in place of the input pixel of interest value. The counter C is then reduced by "1".

At step S307, the substitution value generation unit 105 determines whether or not output of 64 pieces of pixel data has ended. When the result is NO, it returns to step S302.

If it is determined as a result of the above processing that the pixel of interest is in an acquisition color region and, furthermore, that the counter C is a value other than "0", the processing of step S304 is performed. However, if the counter C is "0", the processing advances to step S305. At step S305, the candidate value Z is output in place of the input value of the pixel of interest.

The contents of processing by the substitution value generation unit 105 will be described with reference to FIGS. 4A to 4C.

Figure 4A:
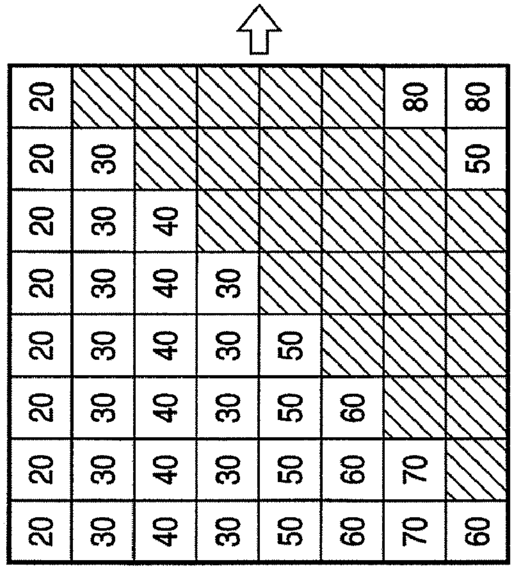
FIGS. 4A to 4C are views that show examples of the contents of processing of the substitution value generation unit.
Figure 4B:
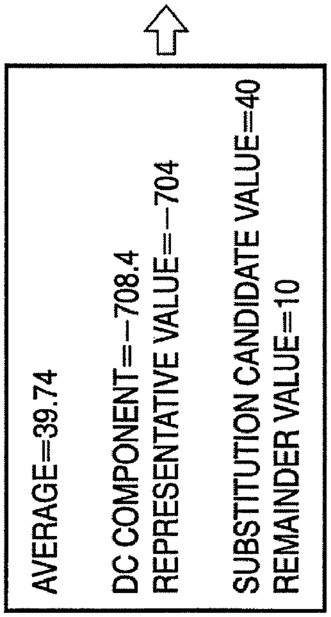

FIG. 4A illustrates an input block. In FIG. 4A, a diagonally shaded portion indicates an acquisition color region. FIG. 4B is a view showing values that are derived from the pixel values of the non-acquisition color regions. In the example shown in FIG. 4B, the average $D_{ave}$ of pixels of the non-acquisition color regions is "39.74", the DC component value is "−708.4", the quantization representative value $D_p$ is "−704", the substitution candidate value Z is "40", and the remainder value R is "10".

Figure 4C:

Accordingly, the result shown in FIG. 4C can be obtained by performing raster scanning for the block shown in FIG. 4A to obtain "41" as the value for the first 10 pixels in the diagonally shaded portions and "40" as the value for the remaining pixels.

The encoding unit 906 performs JPEG encoding as lossy encoding for the block shown in FIG. 4C.

Figure 12A:
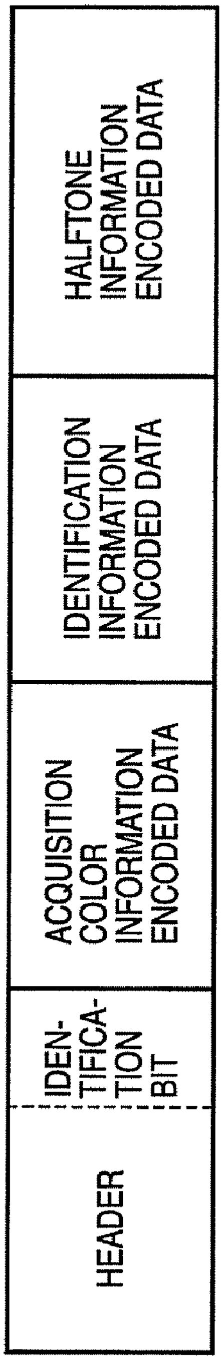
FIGS. 12A and 12B are views that show the structure of one block of encoded data that is generated by a code stream generation unit shown in FIG. 9.

When the code stream generation unit 907 receives a signal indicating that there is acquisition color information from the acquisition unit 902, it generates a header having an identification bit (for example, "1") that indicates there is an acquisition color region. The code stream generation unit 907 then joins together that header and encoded data of acquisition color information, encoded data of identification information, and encoded data of halftone information that is output from the encoding units 904 to 906, and outputs the resulting data. FIG. 12A is a view that shows the structure of the encoded data in this case.

Figure 12B:
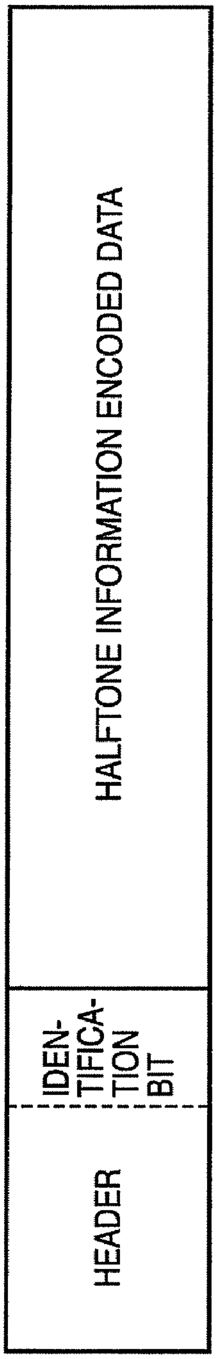

Further, when the code stream generation unit 907 receives a signal indicating that there is no acquisition color information from the acquisition unit 902, it generates a header having an identification bit (for example "0") that indicates there is no acquisition color region. The code stream generation unit 907 then joins together that header and encoded data of halftone information that is output from the encoding unit 906, and outputs the resulting data. That is, it ignores the encoded data of the identification information and the acquisition color information. FIG. 12B is a view showing the structure of the encoded data in this case.

As described above, according to the first embodiment, a pixel that is inside an acquisition color region is substituted with a value that is close to the average of a non-acquisition color region, and a DC coefficient after quantization inside the encoding unit 906 matches a quantization representative value. As a result, since quantization errors for the DC component become zero, block distortion caused by quantization errors of the DC component can be minimized. Further, the coefficient values of high frequency components after DCT transformation by substitution processing inevitably become small values. Accordingly, the probability that a coefficient after quantization of a high frequency will be "0" increases, and it is also possible to increase the compressibility.

In this connection, although according to the above embodiment an example was described in which pixel positions that are objects for allocation of the remainder value R are taken in raster scanning order, the present invention is not limited thereto. For example, in the flowchart shown in FIG. 3, "number N of acquisition color region—remainder value R" may be set for the counter C. The candidate value Z may then be output for pixel data of the first "number N of acquisition color region—remainder value R" items in accordance with the raster scan, and "Z+1" may be output as the pixel data of the remaining R items.

Figure 13:
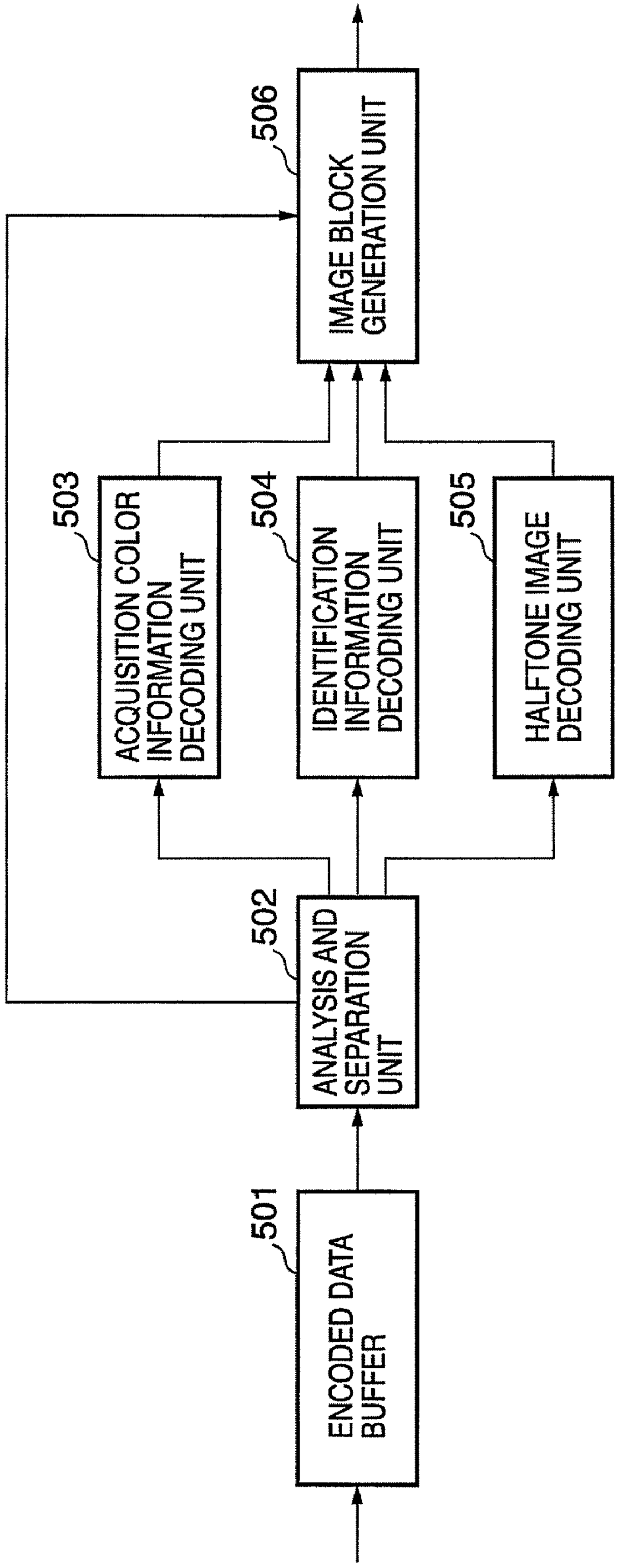
FIG. 13 is a block configuration diagram of an image decoding apparatus according to the first embodiment.

FIG. 13 is a view showing a block configuration diagram of an apparatus that decodes the aforementioned encoded data, and an outline of the flow of the decoding process will now be described. As shown in FIG. 13, the apparatus includes an encoded data buffer 501, an analysis and separation unit 502, an acquisition color information decoding unit 503, an identification information decoding unit 504, a halftone image decoding unit 505, and an image block generation unit 506.

Upon encoded data for one block being stored in the encoded data buffer 501, the analysis and separation unit 502 analyzes the header of the encoded data to determine the identification bit therein. When the identification bit is “1”, it means that the encoded data has the structure shown in FIG. 12A, and therefore the analysis and separation unit 502 distributes each piece of encoded data that is stored in the encoded data buffer 501 to the decoding units 503 to 505, respectively. At this time, the analysis and separation unit 502 also outputs the identification bit information to the image block generation unit 506. As a result, the decoding units 503 to 505 perform decoding processing for the encoded data distributed to the respective decoding unit, and output the resulting data to the image block generation unit 506.

Further, when the identification bit is “0”, it means that the encoded data has the structure shown in FIG. 12B. Accordingly, the analysis and separation unit 502 distributes the encoded data stored in the encoded data buffer 501 only to the halftone image decoding unit 505. At this time, the analysis and separation unit 502 also outputs the identification bit information to the image block generation unit 506.

When the identification bit received from the analysis and separation unit 502 is “0”, the image data of the 8×8 pixels that is output from the halftone image decoding unit 505 is output as it is by the image block generation unit 506. When the identification bit received from the analysis and separation unit 502 is “1”, for pixels for which the identification information is “0”, the image block generation unit 506 outputs the pixel data that is output from the halftone image decoding unit 505. Further, for pixels for which the identification information is “1”, the image block generation unit 506 outputs in sequential order the pixel data that is decoded at the acquisition color information decoding unit 503.

Second Embodiment

Figure 5:
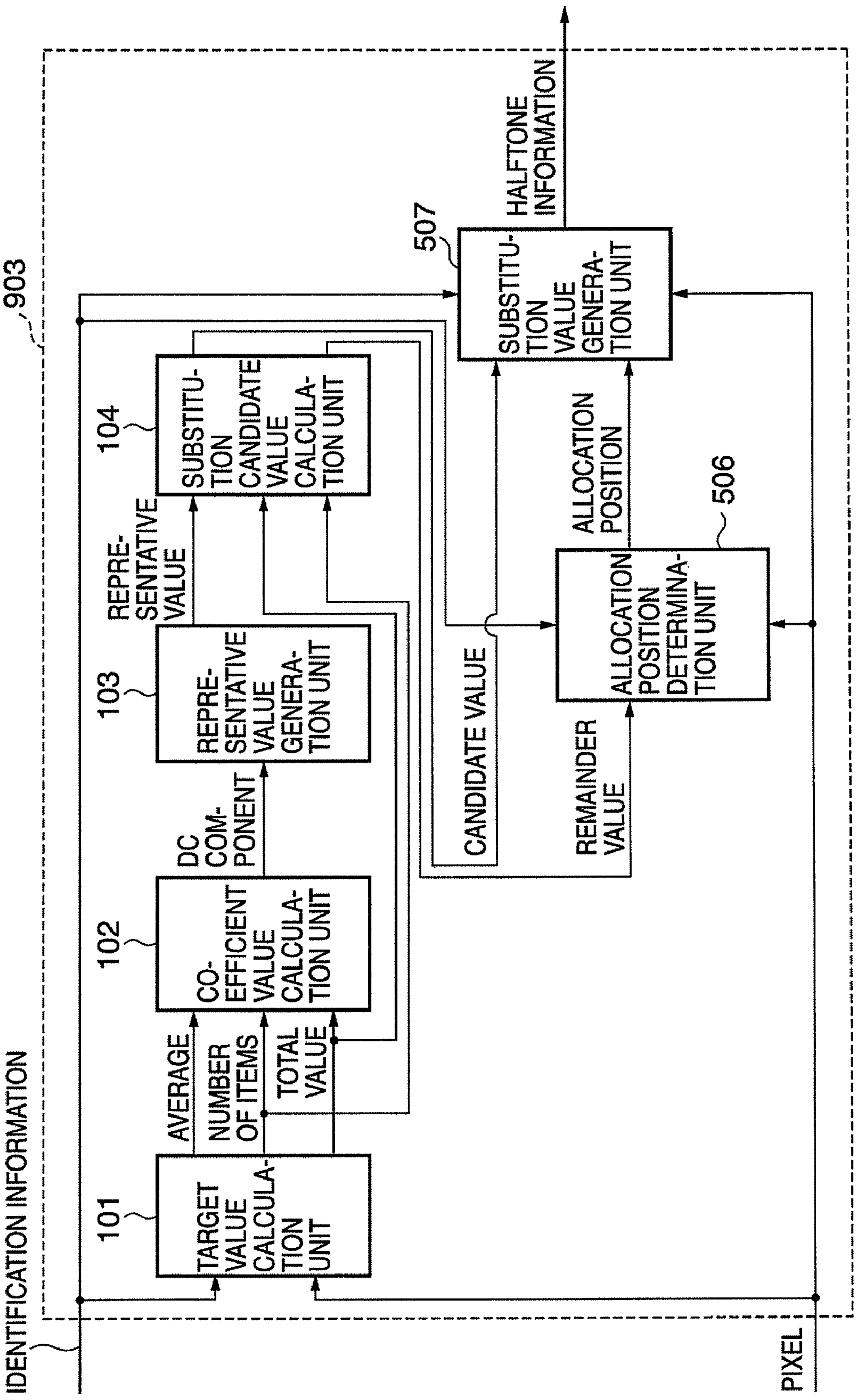
FIG. 5 is a block configuration diagram of a substitution unit according to the second embodiment.

FIG. 5 is a block diagram that describes the configuration of a substitution unit 903 according to the second embodiment. In FIG. 5, sections that perform the same operations as those in FIG. 1 are assigned the same reference numeral. Reference numeral 506 denotes an allocation position determination unit and reference numeral 507 denotes a substitution value generation unit. Hereunder, only sections that are different from the first embodiment are described.

The second embodiment is an apparatus that decides allocation positions for a remainder value based on pixel values for a non-acquisition color in the vicinity of an acquisition color region.

A remainder value R, identification information, and pixel data are input into the allocation position determination unit 506 shown in FIG. 5, and data that takes “coordinates, pixel data, and continuous number” as one record as described later is stored in an internally provided memory.

Figure 6:
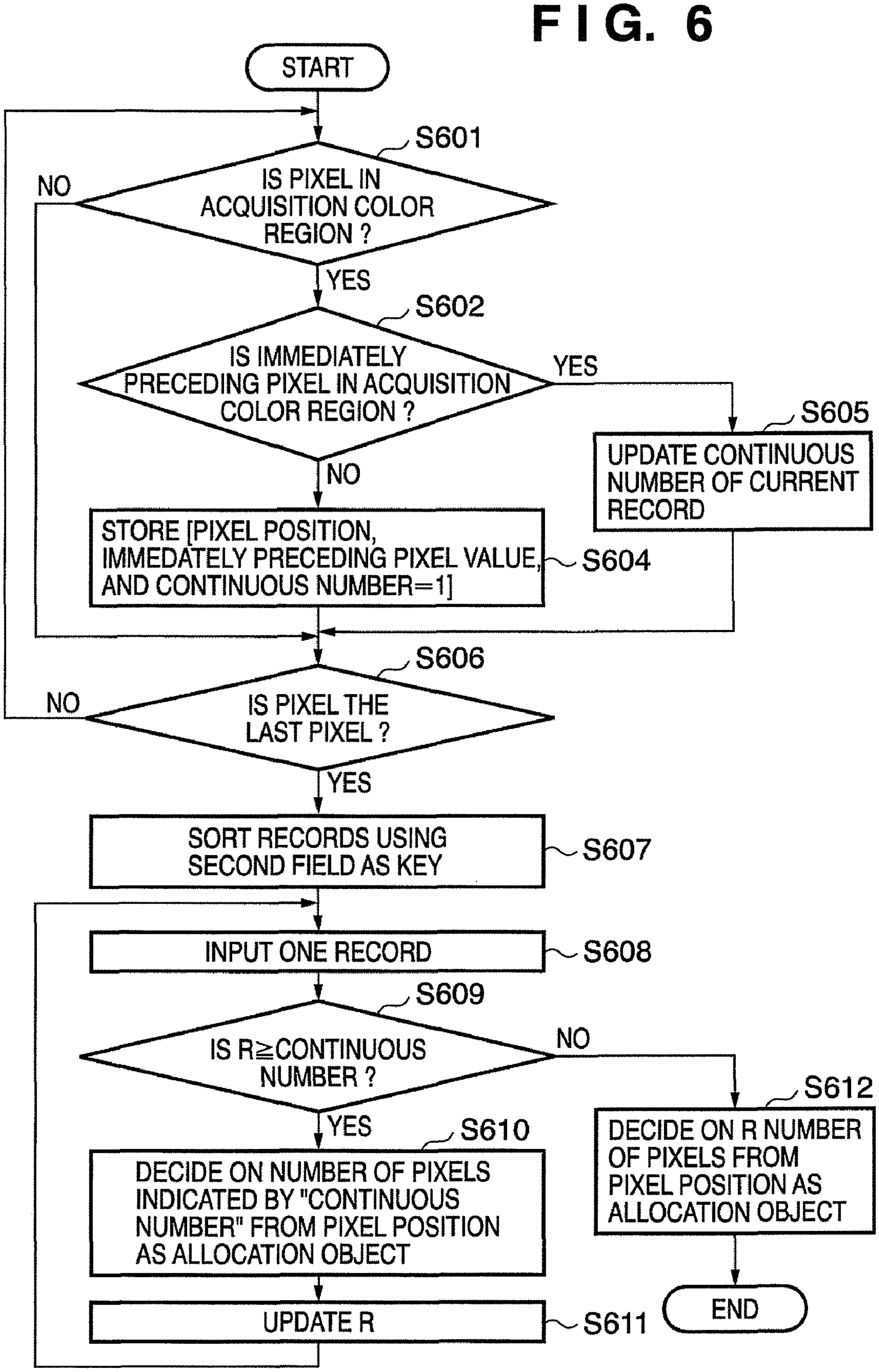
FIG. 6 is a flowchart for describing the contents of processing in an allocation position determination unit according to the second embodiment.

Hereunder, the contents of processing of the allocation position determination unit 506 are described specifically using the flowchart shown in FIG. 6.

In the following description, it is assumed that the positions of the pixels of interest are updated in raster scanning order. Although a pixel that immediately precedes the first pixel (0th pixel) does not actually exist, the immediately preceding pixel is treated as a pixel of a non-acquisition color region.

First, in step S601, the allocation position determination unit 506 determines whether or not an input pixel is in an acquisition color region. When it is determined that the pixel of interest is in an acquisition color region, the operation advances to step S602. At step S602, the allocation position determination unit 506 determines whether or not the immediately preceding pixel, i.e., an input pixel delayed by one cycle, is a pixel in an acquisition color region.

When the immediately preceding pixel is a pixel in a non-acquisition color region, it indicates that the pixel of interest is a pixel that is at the boundary of the acquisition color region. Therefore, in step S604, data for one record that consists of the position of the pixel of interest, the value of the immediately preceding pixel, and continuous number “1” is stored in the memory.

Further, in step S602, when it is determined that the immediately preceding pixel is in an acquisition color region, it indicates that the pixels inside the acquisition color region are continuous. Therefore, at step S605, the continuous number in the current record that is stored in the memory is incremented by “1”.

After the processing of either step S604 or step S605 is performed, the operation proceeds to step S606. At step S606 the allocation position determination unit 506 determines whether or not the pixel of interest is the last pixel in the block. When the pixel of interest is not the last pixel, the processing from step S601 onward is repeated.

Figures 8A, 8B, 8C, 8D:
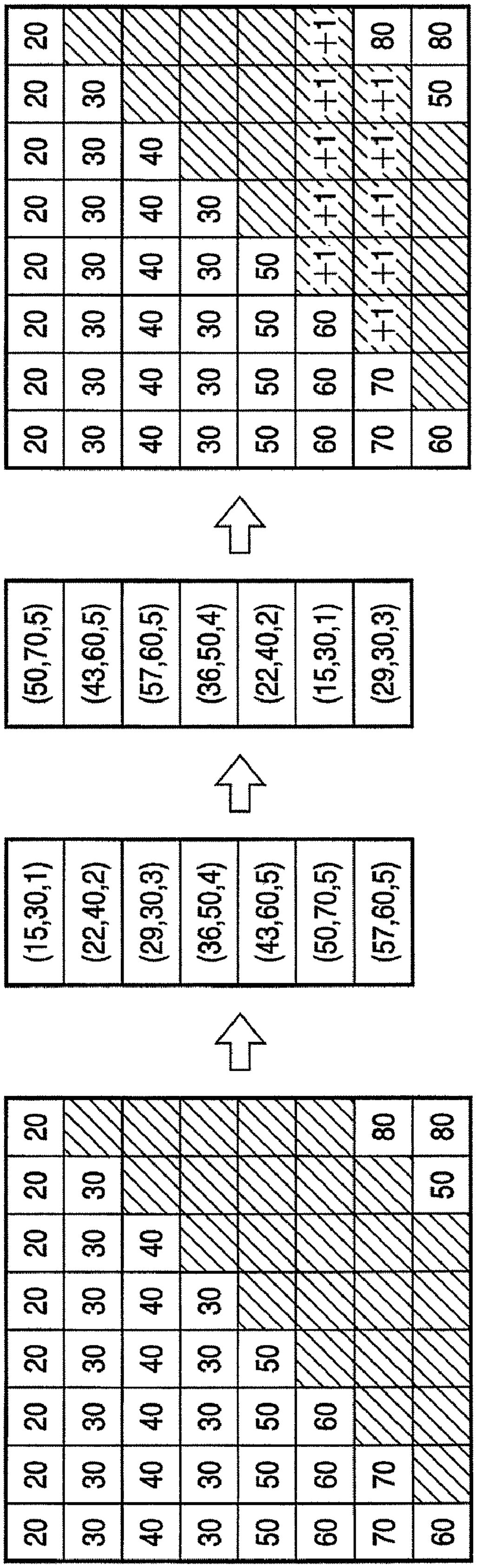
FIGS. 8A to 8D are views that show an example of the contents of processing of an allocation position determination unit according to the second embodiment.

In this case, it is assumed that the block of interest is the data shown in FIG. 8A. In FIG. 8A, a diagonally shaded portion represents an acquisition color region (identification information is “1”).

In this case, when checking is completed for the last pixel at step S606, data for seven records is stored in the internal memory of the allocation position determination unit 506 as shown in FIG. 8B. The first record “15, 30, 1” indicates that the $15^{th}$ pixel when the block underwent raster scanning is an acquisition color region, the pixel value of an immediately preceding non-acquisition color region is “30”, and the number of continuous pixels that are judged as an acquisition color region is “1”. The second record “22, 40, 2” indicates that the $22^{nd}$ pixel when the block underwent raster scanning is an acquisition color region, the pixel value of an immediately preceding non-acquisition color region is “40”, and the number of continuous pixels that are judged as an acquisition color region is “2”. The meaning of the remaining records will be readily understood.

At step S607, these seven records are sorted in ascending order taking the second field of each record, that is, the data of the pixel immediately preceding the pixel that is an acquisition color region as a key. As a result, the data of FIG. 8B is rearranged as shown in FIG. 8C.

At step S608, the allocation position determination unit 506 inputs the data for one record that is in its own memory. Next, in step S609, it compares the remainder value R from the substitution candidate value calculation unit 104 and the continuous number that is input. When the allocation position determination unit 506 determines that “R≧continuous number”, at step S610 it decides on the pixels indicated by the continuous number from the pixel position of the input one record as objects for allocating a value “+1”. Subsequently, at step S611, the allocation position determination unit 506 updates the remainder value R by subtracting the continuous number from the remainder value R, and returns to step S608.

When it is determined at step S609 that “remainder value R<continuous number”, the processing advances to step S612. At step S612, the allocation position determination unit 506 decides on the number of pixels indicated by the remainder value R at that time from the pixel position in the input one record as objects for allocating a value “+1”.

As a result of the foregoing, when the remainder value R from the substitution candidate value calculation unit 104 is “10”, as shown in FIG. 8D, ten pixel positions are decided as objects for addition of the value “+1”. Accordingly, for pixels for which the identification information is “0”, the substitution value generation unit 507 shown in FIG. 5 outputs the input halftone pixel data as it is. Furthermore, for pixels for which the identification information is "1" and an allocation value from the allocation position determination unit 506 is "+1", the substitution value generation unit 507 outputs "candidate value+1". For pixels for which the identification information is "1" and the allocation value from the allocation position determination unit 506 is a value other than "+1", the substitution value generation unit 507 outputs "candidate value".

Figure 7:
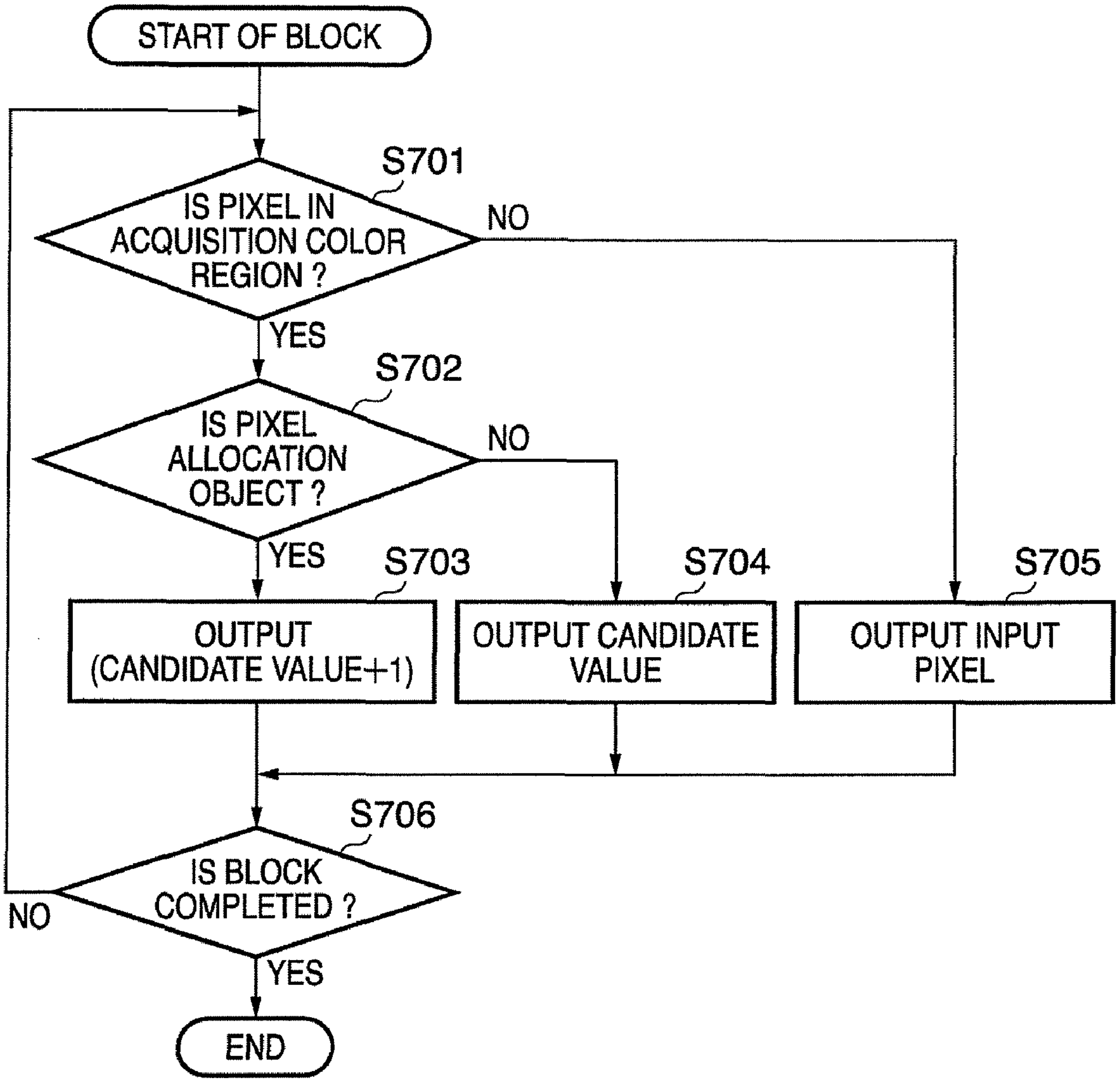
FIG. 7 is a flowchart for describing the contents of processing of a substitution value generation unit according to the second embodiment.

FIG. 7 is a view showing the contents of processing of the substitution value generation unit 507 according to this second embodiment.

First, at step S701, the substitution value generation unit 507 determines whether or not the pixel of interest is in an acquisition color region. When the pixel of interest is not in an acquisition color region, at step S705 the substitution value generation unit 507 outputs the value of the input halftone pixel as it is to the encoding unit 906.

Further, when substitution value generation unit 507 determines that the pixel of interest is in an acquisition color region, the processing advances to step S702 to determine whether or not the pixel of interest position is a pixel that is an allocation object. When the result is NO, at step S704 the substitution value generation unit 507 outputs the candidate value from the substitution candidate value calculation unit 104 as the halftone pixel data of the pixel of interest to the encoding unit 906.

At step S702, when the substitution value generation unit 507 determines that the pixel of interest position is that of a pixel that is an allocation object, the operation advances to step S703. At step S703, the substitution value generation unit 507 outputs "candidate value+1" from the substitution candidate value calculation unit 104 as the halftone pixel data of the pixel of interest to the encoding unit 906.

As a result of the foregoing, pixels that are objects for allocation of the remainder value become concentrated in the vicinity of pixels with a large halftone value in that neighborhood. Thus, the boundary between an acquisition color region and a non-acquisition color region becomes smooth, and it is possible to further reduce the occurrence of high frequency component coefficients in blocks after DCT transformation. More specifically, it is possible to increase the probability that a coefficient after quantization will be "0" or a value close to "0" and also to increase the compression coding ratio.

The present invention is not limited to the above described method. For example, a method may be employed in which, first, after an acquisition color region is filled with the average of a non-acquisition color region, the acquisition color region undergoes sorting with a differential value, and the aforementioned remainder is allocated to a pixel with the largest difference among acquisition color pixels for which the difference decreases. The method may also be one in which this operation is repeated until the aforementioned remainder reaches 0.

Third Embodiment

In the above described embodiments it was assumed that the size of one block is 8×8 pixels. According to this third embodiment, an example is described in which the size of one block is taken as being a size that is larger than 8×8 pixels to further improve the efficiency.

FIG. 18 is a block configuration diagram of an image encoding apparatus according to the third embodiment. Although the configuration thereof is almost the same as that of the first embodiment, the contents of processing are different.

Figure 19:
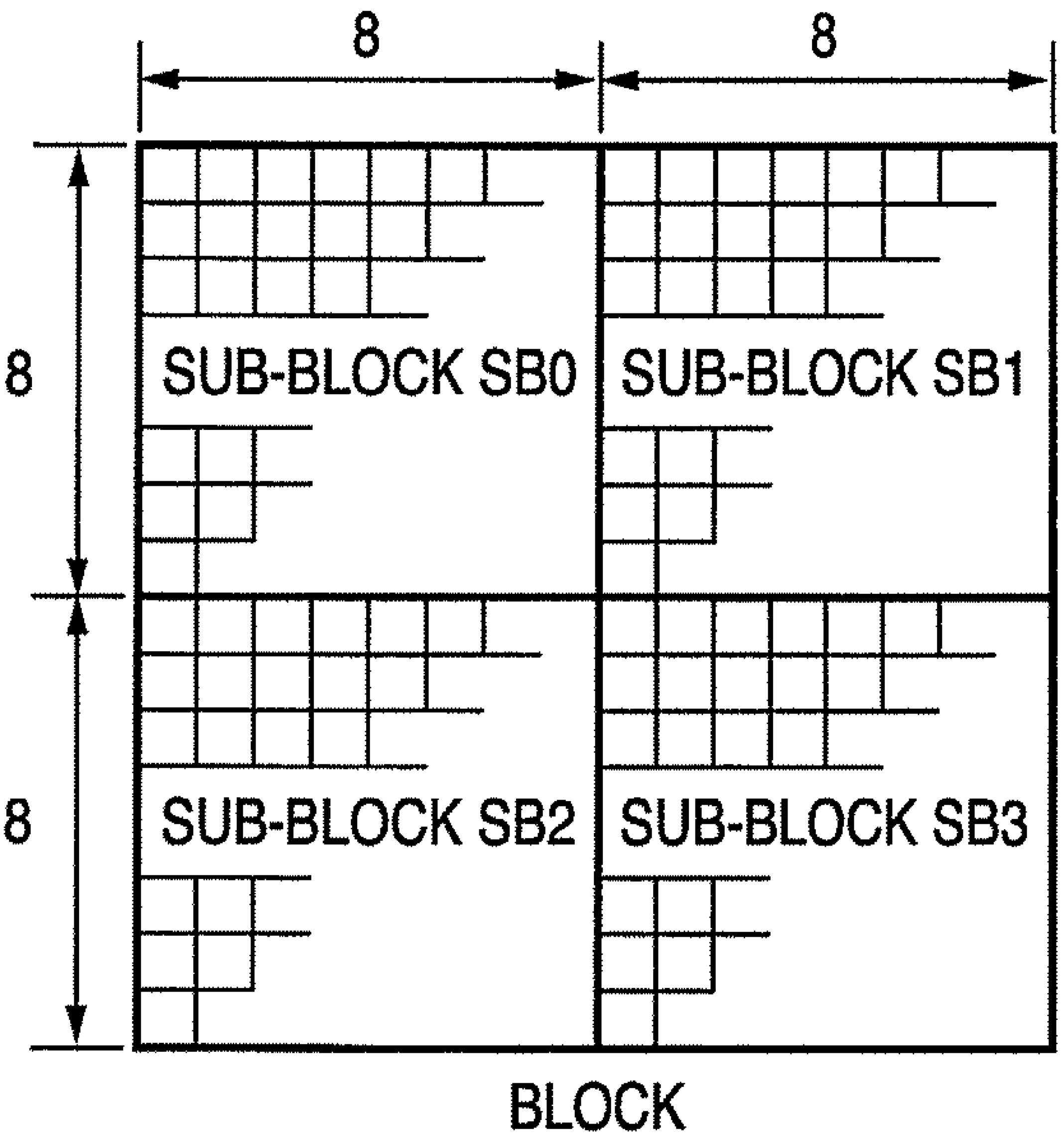
FIG. 19 is a view showing the correlation between a block as a unit for encoding and sub-blocks.

At a blocking unit 1501, blocks consisting of n×m pixels are input in units from image data as the encoding object, those blocks are divided into sub-block unit of 8×8 pixels, and the image data of those sub-blocks is output. In this case, n and m are integral multiples of 8. In order to simplify the description, in this case it is assumed that n=m=16. More specifically, as shown in FIG. 19, at the blocking unit 1501, a 16×16 pixel block is input, and image data of four sub-blocks of 8×8 pixels is output. The output order is the order sub-block SB0, SB1, SB2, and SB3 as shown in FIG. 19.

An acquisition unit 1502 determines an acquisition color by a predetermined method from the block images (images of four sub-blocks), and outputs the result. The acquisition unit 1502 also outputs pixels having an acquisition color and pixels without an acquisition color (having a non-acquisition color) that exist in the block as identification information. The principles for generating the identification information are the same as in the first embodiment. However, in the case of this embodiment, since the size of one block is 16×16 pixels, the positional information is 16×16 pieces of binary data, i.e. data of 16×16 bits.

Based on the input identification information, a substitution unit 1503 performs substitution processing in sub-block units for the pixels of an acquisition color region, and outputs the resulting information as halftone information.

A first encoding unit 1504 subjects acquisition color information of the input block to lossless compression and outputs the resulting data. A second encoding unit 1505 subjects the identification information of the input block to lossless compression and outputs the resulting data. A third encoding unit 1506 subjects the halftone information of the four sub-blocks included in the input block to lossy compression (JPEG encoding in this embodiment) and outputs the resulting data. Next, a code stream generation unit 1507 joins the encoded data that is generated at each encoding unit, and generates and outputs an encoded data stream in a block unit.

To simplify the description, according to the present third embodiment also, for the image data that is the encoding object, it is taken that one pixel is one component, and one pixel is an 8-bit (256 gradations) image (grayscale image). Further, the value 255 is described as black, and the value 0 is described as white. That is, pixel values are described as indicating density. However, this is one example, and the present invention is not limited thereto.

Similarly to the first embodiment, the acquisition unit 1502 determines a threshold in order to generate binary identification information. It then determines pixels having a value that exceeds the threshold to be pixels having an acquisition color. Next, in order to identify the positions of pixels having an acquisition color, the acquisition unit 1502 binarizes the 16×16 pixels of the input block using the determined threshold, and outputs the result as identification information to the encoding unit 1505 and the substitution unit 1503. The binarization is performed by taking a pixel value that exceeds the threshold as "1" and taking a pixel value that is equal to or less than the threshold as "0". FIG. 20A is a view showing this identification information. Further, the substitution unit 1503 performs substitution processing on the sub-block units of 8×8 pixels. Accordingly, the acquisition unit 1502 supplies identification information of 8×8 bits of positions corresponding to sub-blocks to be utilized in substitution processing by the substitution unit 1503 among the acquired identification information of 16×16 bits to the substitution unit 1503. In this connection, this does not apply in a case where a buffer that stores identification information of one block is provided inside the substitution unit 1503.

The acquisition unit 1502 performs raster scanning of 16×16 pixels of one block, acquires input pixel values for which the identification information is "1" in sequential order, aligns the pixel values in a one-dimensional manner as shown in FIG. 20B, and outputs those pixel values as acquisition color information to the encoding unit 1504.

When the image data that is the encoding object is image data that is optically read with an image scanner or the like, each pixel of a character and/or line image will not necessarily be a single color due to the reading accuracy and the like. Accordingly, as shown in FIG. 20B, although the values will be varied to some degree, the degree of variance is small. Consequently, the encoding unit 1504 according to the present embodiment employs lossless encoding that, for example, utilizes predictive coding.

When encoding image data that is output directly from a computer without using an image scanner or an image that is rendered in accordance with print data from a computer, a character and/or line image will be a single color (density) since errors do not occur. Therefore, in such case, since pixels that exceed the threshold all have the same value, the acquisition color information will be one piece of data. In this case, it is sufficient for the encoding unit 1504 to encode that one piece of data. Further, when it is judged that the degree of variance is small even when the data has been read with a scanner or the like, it is sufficient to select one represented value (for example, medium value) and encode that value.

Since the identification information is 16×16 pieces of binary data as shown in FIG. 20A, it is sufficient for the encoding unit 1505 to perform lossless encoding (predictive coding, run-length encoding or the like) that is specific to binary data.

When there is only one frequency peak with respect to the density within a block, in other words, when an acquisition color region does not exist within a block, the acquisition unit 1502 outputs all the bits of the identification information as "0". At this time, the acquisition unit 1502 outputs a signal indicating that there is no acquisition color information in the block of interest to the code stream generation unit 1507. Further, when an acquisition color region exists within a block, the acquisition unit 1502 outputs a signal indicating that there is acquisition color information to the code stream generation unit 1507.

In contrast, the encoding unit 1506 according to this embodiment performs JPEG (lossy) encoding. JPEG encoding is encoding technology that is mounted in digital cameras and the like, and is known as having a high compression ratio with respect to natural images. JPEG is technology that utilizes the fact that human vision is insensitive to high frequency components, and encodes data after removing the high frequency components to some degree to reduce the information amount. However, for character and/or line images and the like it is desirable that the edges thereof are distinct. In other words, it can be said that it is desirable to maintain high frequency components in a character and/or line image.

In this regard, according to the present third embodiment, character and/or line images portions are subjected to lossless encoding by the encoding units 1505 and 1504 and, theoretically, can be completely restored to their original values.

JPEG encoding generates encoded data by executing DCT transformation (discrete cosine transformation), quantization, and entropy encoding processing on the sub-blocks of 8×8 pixels. When a sub-block that includes a character and/or line image undergoes DCT transformation, the influence of the presence of the character and/or line image is evident in the obtained conversion coefficients. Further, in the quantization processing, although quantization is performed in quantization steps that are larger for conversion coefficients of high frequency components, even in that situation the high frequency components must not be cut out completely. This is because if quantization steps are used that are large enough to completely cut out high frequency components, the image quality will be degraded even though the image is a natural image.

Therefore, according to the present embodiment, when performing JPEG encoding for a sub-block in which a character and/or line image exists, a block that is equivalent to a block in which a character and/or line image does not exist for that sub-block is generated, and JPEG encoding is performed at the encoding unit 1506. The substitution unit 1503 shown in FIG. 18 implements this processing.

Hereunder, the configuration and contents of processing of the substitution unit 1503 according to the present embodiment are described in detail. Although parts of the substitution unit overlap with the first embodiment described above, they are described again to facilitate understanding.

Figure 14:
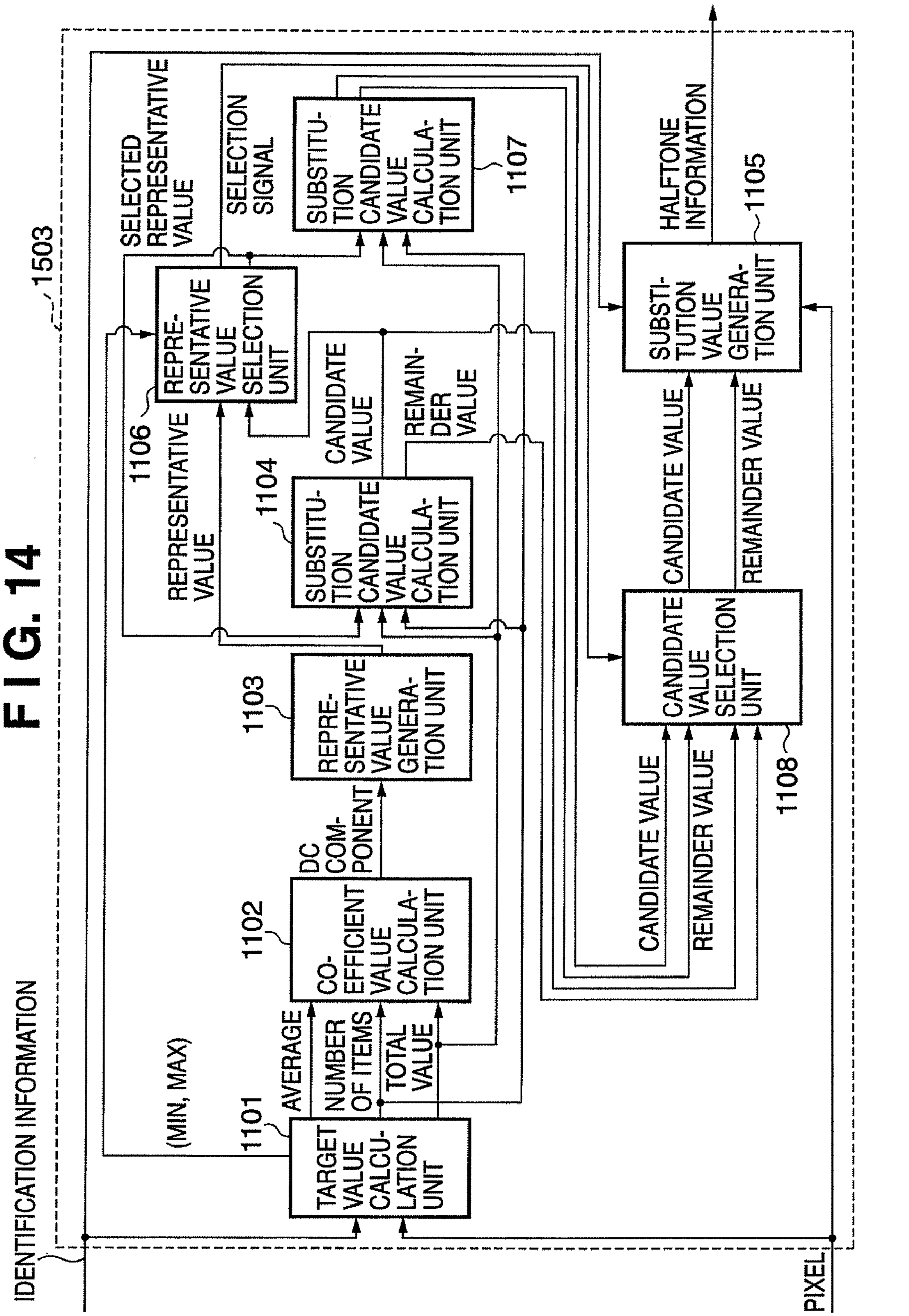
FIG. 14 is a block configuration diagram of a substitution unit according to the third embodiment of the present invention.

FIG. 14 is a detailed block diagram of the substitution unit 1503 according to the present third embodiment. The substitution unit 1503 includes a target value calculation unit 1101, a coefficient value calculation unit 1102, a representative value generation unit 1103, two substitution candidate value calculation units 1104 and 1107, a substitution value generation unit 1105, a representative value selection unit 1106, and a candidate value selection unit 1108. Hereunder, each component constituting the substitution unit 1503 according to this embodiment is described.

Based on 8×8 pixel data for one sub-block and the corresponding identification information of 8×8 bits of the sub-block, the target value calculation unit 1101 calculates a total value D of the values of pixels excluding pixels having an acquisition color, an average $D_{ave}$ of the values of pixels excluding pixels having an acquisition color (pixels of a non-acquisition color region), and a number N of pixels that are judged as having an acquisition color. Further, the target value calculation unit 1101 determines a maximum value Max and a minimum value Min of the pixel values in a non-acquisition color region.

This will now be described to clarify the situation in advance. When the number N of pixels that are judged as the acquisition color is 0, the processing described hereunder is not performed, and the substitution value generation unit 1105 outputs the input pixel values as they are to the encoding unit 1506. Hereunder, attention should be paid to the fact that the description is for a case in which N is a value other than 0. Further, instead of the number of pixels judged as an acquisition color, the number of pixels may be the number of pixels judged as a non-acquisition color. This is because the relationship "number of pixels judged as an acquisition color=64-number of pixels judged as a non-acquisition color" exists, and calculation of one of the values for number of pixels is equivalent to calculating the other value for the number of pixels.

The value of a pixel at coordinates (i,j) among the 8×8 pixels of a sub-block is represented by $X_{,ij}$ *, and the* 8×8 pieces of identification information are denoted as $T_{ij}$. In this case, $T_{ij}$ is either of values "0" and "1". When $T_{ij}=1$, a pixel $X_{ij}$ refers to a pixel that is judged as being a pixel having an acquisition color, i.e. a character and/or line image. When $T_{ij}=0$, a pixel $X_{ij}$ refers to a pixel that is judged as being a pixel having a non-acquisition color, i.e. a natural image (or background image) (see FIG. 20A). Accordingly, the total value D, average $D_{ave}$, and number N are calculated as follows. Further, i and j are integers between 0 and 7.

$$N=\Sigma\Sigma T_{ij}$$

$$D=\Sigma\Sigma X_{ij}\times(1-T_{ij})$$

$$D_{ave}=D/(64-N)$$

where ΣΣ represents the total of i,j=0, 1, 2 . . . 7.

FIG. 15 is a flowchart that illustrates the specific processing procedures of the target value calculation unit 1101. Hereunder, those processing procedures are described in accordance with FIG. 15.

First, in step S1201, a variable D that determines a total value and a variable N that determines the number of items are respectively initialized to 0. Further, "255" is assigned as the initial value for the minimum value MIN, and "0" is assigned as the initial value for the maximum value MAX.

Next, in step S1202, based on the identification information, the target value calculation unit 1101 determines whether or not the pixel of interest is a pixel inside an acquisition color region, that is, whether or not the pixel of interest is a pixel that has an acquisition color. When it is determined that the pixel of interest is a pixel of a non-acquisition color region, the processing advances to step S1203 to add the value of the pixel of interest data to the variable D. The processing then advances to step S1209.

In contrast, when it is determined that the pixel of interest is a pixel inside an acquisition color region, the processing advances to step S1204 and the variable N is incremented by "1".

Thereafter, the processing advances to step S1205 to determine whether or not the pixel of interest value is less than the value of the variable MIN. When the target value calculation unit 1101 determines that the pixel of interest value is less than the value of the variable MIN, at step S1206 it updates the variable MIN by assigning the pixel of interest value to the variable MIN.

At step S1207, the target value calculation unit 1101 determines whether or not the pixel of interest value is greater than the value of the variable MAX. When it determines that the pixel of interest value is greater than the variable MAX value, at step S1208 it updates the variable MAX by assigning the pixel of interest value to the variable MAX.

At step S1209, the target value calculation unit 1101 determines whether or not processing was performed for all of the pixels (64 pixels) in the sub-block. If all the pixels have not been processed, the target value calculation unit 1101 repeats the processing of step S1202 onward to perform processing for the next pixel.

When it is determined at step S1209 that processing was performed for all the pixels in the sub-block, the processing advances to step S1210 to determine the average $D_{ave}$ of pixels in non-acquisition color regions based on the values D and N that are determined as described above.

As a result of the foregoing, the target value calculation unit 1101 can obtain the total value D and average $D_{ave}$ of pixel values in a non-acquisition color region, the number of pixels N inside an acquisition color region, and a maximum value MAX and a minimum value MIN inside a non-acquisition region in sub-block units.

Next, the coefficient value calculation unit 1102 will be described. The coefficient value calculation unit 1102 calculates a DC coefficient that is a direct current component obtained by DCT transformation based on the total value D, the average $D_{ave}$, and the number N that are output by the target value calculation unit 1101.

Generally, when a pixel value is taken as $X_{ij}$ and a coefficient obtained by transformation is taken as $Y_{u,v}$, DCT transformation performs the following operation.

$$Y_{u,v}=(1/4)\alpha(u)\alpha(v)\Sigma\Sigma(X_{ij}-128)\cos((2i+1)u\pi/16)\cos((2j+1)v\pi/16)$$

Here, only in the case of determining the direct current component DC, both u and v are "0", and α(O) is 1/√2. Thus, the direct current component DC after DCT transformation is as shown in the following formula (6).

$$DC=Y_{0,0}=(1/8)\Sigma\Sigma(x_{ij}-128) \tag{6}$$

The substitution unit 1503 according to the present third embodiment basically performs substitution so that the values of pixels judged to have an acquisition color inside a sub-block have the average $D_{ave}$ of pixels judged as a non-acquisition color. Therefore, the coefficient value calculation unit 1102 changes the above described formula (6) to obtain the following formula (7) using the values D, $D_{ave}$, and N that are calculated by the target value calculation unit 1101, calculates a provisional DC component, and outputs that value to the representative value generation unit 1103.

$$DC = \{\text{total value of pixels of non-acquisition color region} + (\text{average of pixels of non-acquisition color region} * \text{number of pixels inside acquisition color region}) - 128\times 64\}/8 = (D + D_{ave}\times N - 128\times 64)/8 \tag{7}$$

Next, the representative value generation unit 1103 according to the third embodiment is described.

As described previously, with JPEG each coefficient that is obtained by DCT transformation is quantized. In this case, the quantization step value of a DC component for quantization performed at the encoding unit 1506 according to the present embodiment is described as "16". Normally, since values below the decimal level occur when quantization is performed, rounding off fractional portions to the nearest integer is performed.

Therefore, after adding "8" (half the value of the quantization step) to the DC component value that is calculated by the coefficient value calculation unit 1102, the representative value generation unit 1103 according to the present embodiment makes the low order four bits "0". As a result, the DC component value that is calculated by the coefficient value calculation unit 1102 can be made an integral multiple of the quantization step, and errors occurring in quantization processing performed by the encoding unit 1506 can substantially be made zero. That is, the representative value generation unit 1103 changes the DC component value that is calculated by the coefficient value calculation unit 1102 to a value that is approximate to the DC component value and is an integral multiple of the quantization step. The representative value generation unit 1103 outputs the resulting value as a quantization representative value $D_p$ to the representative value selection unit 1106.

Next, the substitution candidate value calculation unit 1104 is described.

Here, the quantization representative value of the sub-block of interest is provisionally expressed as $D_p$. When the value of a pixel in an acquisition color region is taken as Z, referring to formula (7), it is necessary that $D_p$ and Z satisfy the following formula (8).

$$D_p=(D+Z\times N-128\times 64)/8 \tag{8}$$

In this case, the quantization representative value of the sub-block immediately preceding the sub-block of interest is expressed as $D_{p-1}$. In order to make the quantization representative value $D_p$ of the sub-block of interest equal to the quantization representative value $D_{p-1}$ of the immediately preceding sub-block, formula (8) changes to the following formula (8').

$$D_{p-1}=(D+Z\times N-128\times 64)/8 \tag{8'}$$

The number of pixels N in acquisition color regions and the total value D of pixels in non-acquisition color regions inside the sub-block of interest from the target value calculation unit 1101 and the representative value $D_{p-3}$ of the immediately preceding sub-block that is selected by the representative value selection unit 1106, described later, are input to the substitution candidate value calculation unit 1104. The substitution candidate value calculation unit 1104 then generates a candidate value Z and a remainder value R.

$$Z = \{8\times D_{p-1} - D + 128\times 64\}/N = \{8\times(\text{quantization representative value of immediately preceding sub-block}) - (\text{total value of pixels of non-acquisition color region}) - 128\times 64\}/(\text{number of pixels judged as being in acquisition color region}) \tag{9}$$

$$R = \{8\times D_{p-1} - D + 128\times 64\}\ \%\ N \tag{10}$$

Here, [A % B] is a function that returns a surplus when an integer A is divided by an integer B.

That is, by making the value of each pixel that is judged to have an acquisition color a value that is determined by formula (9), an error does not occur in a DC component when quantization is performed at the encoding unit 1506 at a subsequent stage. However, the pixel value must be an integer. More specifically, if the values are left as they are, a remainder value (surplus) produced by formula (9) will be ignored. Therefore, the substitution candidate value calculation unit 1104 calculates the remainder value R using formula (10). As described in detail later, this remainder value R is a value that is distributed to the pixels of the acquisition color region.

The substitution candidate value calculation unit 1104 outputs the candidate value Z that is calculated as described above to the representative value selection unit 1106 as a quantization representative value, and also outputs the remainder value R to the candidate value selection unit 1108.

In this connection, the description according to the present third embodiment is made on the assumption that four sub-blocks exist in one block. Accordingly, when the initial sub-block SB0 is taken as the sub-block of interest, there is no immediately preceding sub-block. More specifically, this means that when the sub-block of interest is the initial sub-block SB0, processing performed by the substitution candidate value calculation unit 1104 will be meaningless. However, a problem does not arise because, when the representative value selection unit 1106 described hereunder selects a representative value for the initial sub-block SB0, it selects the representative value $D_p$ from the representative value generation unit 1103.

Hereunder, the representative value selection unit 1106 is described. The representative value selection unit 1106 selects either one of the quantization representative values that are output from the representative value generation unit 1103 and the substitution candidate value calculation unit 1104, and outputs the selected value. The selection conditions are as follows.

(i) When Selecting Quantization Representative Value for Sub-Block SB0

The representative value selection unit 1106 selects the quantization representative value $D_p$ that is generated by the representative value generation unit 1103, and outputs that value to the substitution candidate value calculation unit 1107 and the substitution candidate value calculation unit 1104. At this time, the representative value selection unit 1106 stores the selected quantization representative value in an internal memory (not shown), and sends a control signal to the effect that the quantization representative value from the representative value generation unit 1103 is selected to the candidate value selection unit 1108.

In this connection, the quantization representative value $D_p$ that is output to the substitution candidate value calculation unit 1104 from the representative value selection unit 1106 becomes the quantization representative value of the immediately preceding sub-block when the substitution candidate value calculation unit 1104 performs processing for the next sub-block.

(ii) When selecting quantization representative value of sub-blocks SB1, SB2, and SB3 that are other than sub-block SB0

The representative value selection unit 1106 judges whether the relationship between the candidate value Z that is output from the substitution candidate value calculation unit 1104 and the values for MIN and MAX that are calculated by the target value calculation unit 1101 satisfy the following condition:

$$\text{MIN} \leqq Z < \text{MAX} \tag{11}$$

If the aforementioned relationship does not satisfy the above described inequality (11), it means that the color of each pixel in a non-acquisition color region in the sub-block of interest is different to that of the immediately preceding sub-block. Accordingly, if the candidate value that is calculated at the substitution candidate value calculation unit 1104 is selected as the quantization representative value of the sub-block of interest, the range of values that a halftone value in a sub-block can take after substitution will increase. As a result, the possibility that many values other than 0 will be included in high frequency components AC after DCT transformation in the encoding unit 1506 will increase and the encoding efficiency will become poor. Therefore, when it determines that the inequality (11) is not satisfied, the representative value selection unit 1106 selects the quantization representative value $D_p$ that is generated at the representative value generation unit 1103, and outputs that value to the substitution candidate value calculation unit 1107 and the substitution candidate value calculation unit 1104.

In contrast, when it determines that the inequality (11) is satisfied, the representative value selection unit 1106 selects the candidate value from the substitution candidate value calculation unit 1104 as the quantization representative value $D_p$, and outputs that value to the substitution candidate value calculation unit 1107 and the substitution candidate value calculation unit 1104. Consequently, since the quantization representative value of the sub-block of interest and the quantization representative value of the immediately preceding sub-block become the same value, it is also possible to minimize the code length when encoding a differential DC component.

In this connection, whichever value is selected and output, the representative value selection unit 1106 stores the selected quantization representative value in the internal memory, and sends a control signal indicating which value is selected to the candidate value selection unit 1108.

The processing of the other substitution candidate value calculation unit 1107 is substantially the same as that of the substitution candidate value calculation unit 1104. However, the value that the substitution candidate value calculation unit 1107 refers to is the quantization representative value that is output from the representative value selection unit 1106.

Next, the candidate value selection unit 1108 is described. In accordance with the control signal from the representative value selection unit 1106, the candidate value selection unit 1108 selects either a set of the remainder value and the candidate value calculated at the substitution candidate value calculation unit 1104 or a set of the remainder value and the candidate value calculated at the substitution candidate value calculation unit 1107, and outputs the selected values to the substitution value generation unit 1105.

More specifically, when the control signal from the representative value selection unit 1106 indicates that the quantization representative value from the representative value generation unit 1103 is selected, it means that the DC component of the sub-block of interest is matched with the quantization representative value of the quantization representative value generation unit 1103. Accordingly, in this case, the representative value selection unit 1106 selects and outputs the substitution value and the candidate value of the substitution candidate value calculation unit 1107. In contrast, when the control signal from the representative value selection unit 1106 indicates that the quantization representative value of the immediately preceding sub-block is selected, the DC component of the sub-block of interest is matched with the quantization representative value of the immediately preceding sub-block. Therefore, the representative value selection unit 1106 selects and outputs the substitution value and the candidate value of the substitution candidate value calculation unit 1104.

Next, the substitution value generation unit 1105 is described. As described previously, when all the identification information for the sub-block of interest is "0", that is, when no acquisition color region exists in the sub-block of interest, the substitution value generation unit 1105 outputs the input sub-block pixel values as they are to the encoding unit 1506.

The following description is made on the assumption that an acquisition color region exists in the sub-block of interest. The processing of the substitution value generation unit 1105 in this case will be described in accordance with the flowchart shown in FIG. 16. This processing distributes the remainder value R by substituting pixel values in an acquisition color region in the sub-block of interest with the candidate value Z that is output by the candidate value selection unit 1108 and also adding a further "1" to the R number of pixels that are the substitution object.

Figure 16:
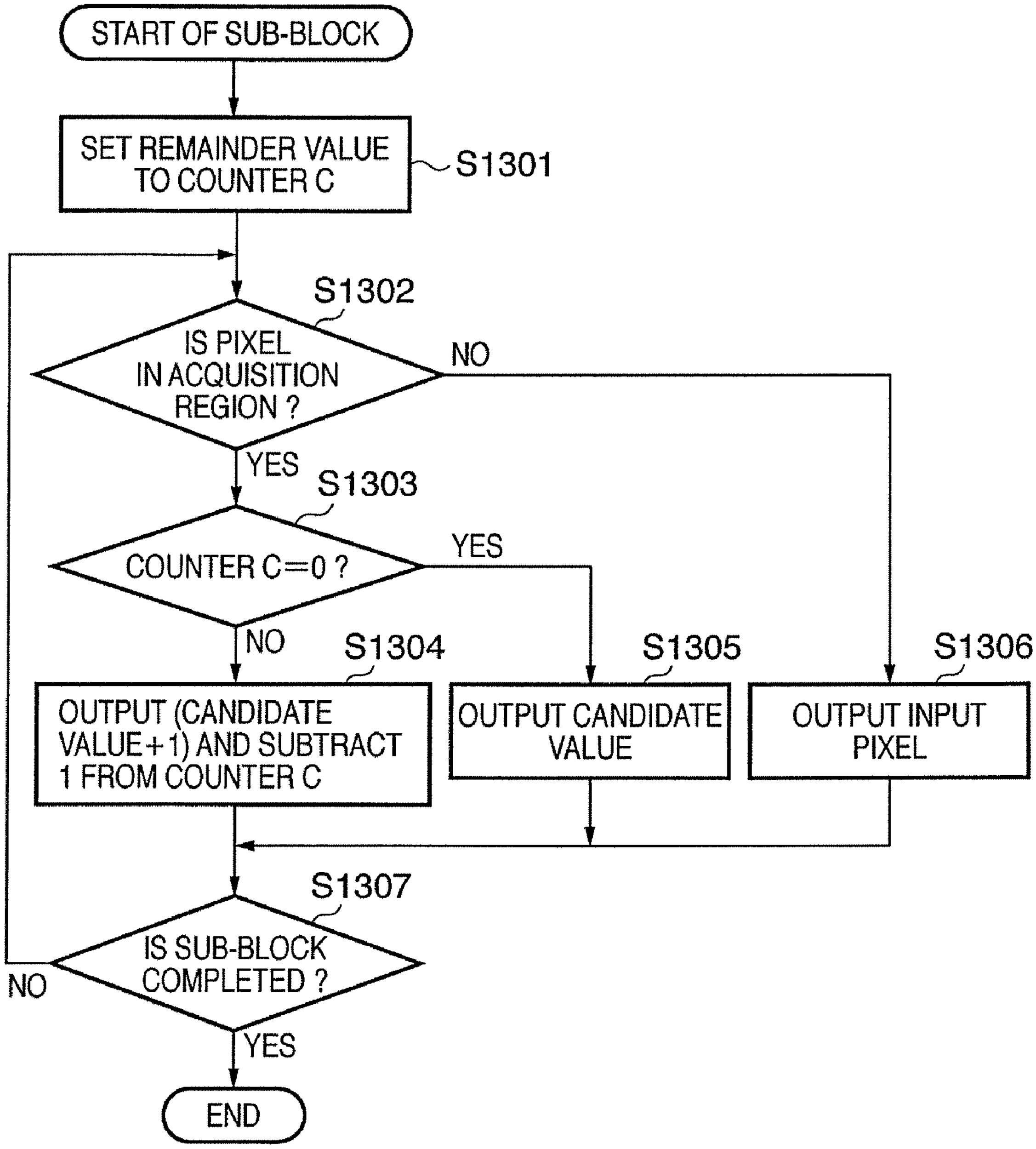
FIG. 16 is a flowchart for describing the contents of processing of a substitution value generation unit according to the third embodiment.

For the flowchart shown in FIG. 16, the direction of updating the position of a pixel of interest is described as the raster scanning direction.

First, at step S1301, a counter C is set to the remainder value R as an initial value.

Next, in step S1302, the substitution value generation unit 1105 determines whether or not the pixel of interest is in an acquisition color region. When it is determined that the pixel of interest is in a non-acquisition region, the processing advances to step S1306 to output the input pixel data as it is.

On the other hand, when it is determined at step S1302 that the pixel of interest is in an acquisition color region, the processing advances to step S1303 to determine whether or not the counter C is "0". If the result is NO, the processing advances to step S1304. At step S1304, "Z+1" is output in place of the input pixel of interest value. The counter C is then reduced by "1".

At step S1307, the substitution value generation unit 1105 determines whether or not output of 64 pieces of pixel data has ended. When the result is NO, it returns to step S1302.

If it is determined as a result of the above processing that the pixel of interest is in an acquisition color region and, furthermore, that the counter C is a value other than "0", the processing of step S1304 is performed. In contrast, if the counter C is "0", the processing advances to step S1305. At step S1305, the candidate value Z is output in place of the input pixel of interest value.

The contents of processing by the substitution value generation unit 1105 will be described with reference to FIGS. 17A to 17D.

FIGS. 17A to 17D show halftone image data after substitution processing of four sub-blocks that are included in one block. In the figures, the diagonally shaded regions represent an acquisition color region of each sub-block. In the case illustrated in FIGS. 17A to 17D, the DC components for the respective sub-blocks are all "–800". As a result, the value "0" continues as the differential value of the post-quantization DC component of sub-blocks SB1, SB2, and SB3 that follow the leading sub-block SB0 at the encoding unit 1506. Further, when the quantization step width is taken as 16, a quantization error does not occur at the time of quantization.

When the code stream generation unit 1507 receives a signal indicating that there is acquisition color information from the acquisition unit 1502, it generates a header having an identification bit (for example "1") that indicates there is an acquisition color region. The code stream generation unit 1507 then joins together that header and acquisition color information encoded data, identification information encoded data, and halftone information encoded data of the four sub-blocks that is output from the encoding units 1504 to 1506, and outputs the resulting data. FIG. 12A is a view that shows the structure of the encoded data of one block in this case. However, according to the present third embodiment, the identification information encoded data is encoded data for identification information of 16×16 bits, and the halftone information encoded data is JPEG encoded data of four sub-blocks.

Further, when the code stream generation unit 1507 receives a signal indicating that there is no acquisition color information from the acquisition unit 1502, it generates a header having an identification bit (for example "0") that indicates there is no acquisition color region. The code stream generation unit 1507 then joins that header and halftone information encoded data of the four sub-blocks that is output from the encoding unit 1506, and outputs the resulting data. That is, it ignores the encoded data of the identification information and the acquisition color information. FIG. 12B is a view showing the structure of the encoded data of one block in this case. Note that the present third embodiment is different from the first embodiment in the respect that the halftone information encoded data is JPEG encoded data of four sub-blocks.

Figure 21:
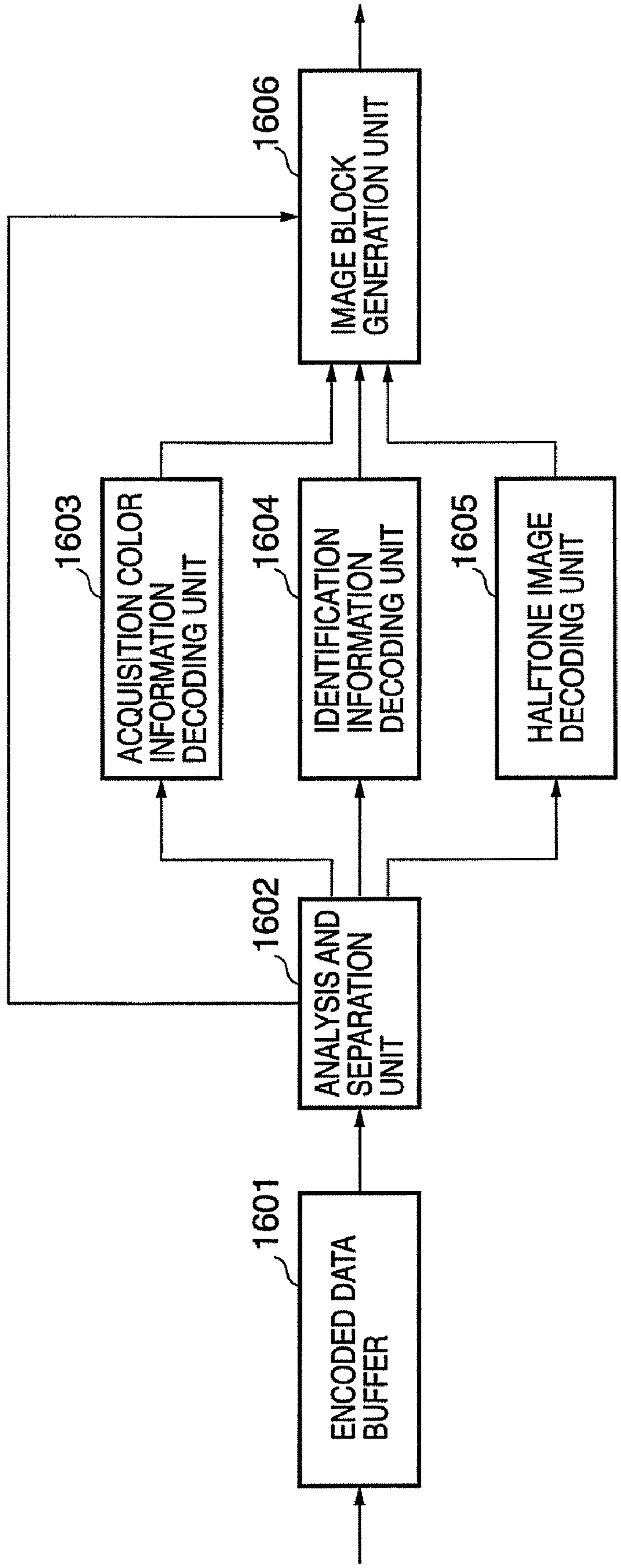
FIG. 21 is a block configuration diagram of an image decoding apparatus according to the third embodiment.

FIG. 21 is a view showing a block configuration diagram of an apparatus that decodes the aforementioned encoded data. An outline of the flow of the decoding process will now be described. As shown in FIG. 21, the apparatus includes an encoded data buffer 1601, an analysis and separation unit 1602, an acquisition color information decoding unit 1603, an identification information decoding unit 1604, a halftone image decoding unit 1605, and an image block generation unit 1606.

Upon encoded data for one block being stored in the encoded data buffer 1601, the analysis and separation unit 1602 analyzes the header of that encoded data to determine the identification bit therein. When the identification bit is "1", it means that the encoded data has the structure shown in FIG. 12A. Therefore the analysis and separation unit 1602 distributes each piece of encoded data that is stored in the encoded data buffer 1601 to the decoding units 1603 to 1605, respectively. At this time, the analysis and separation unit 1602 also outputs the identification bit information to the image block generation unit 1606. The halftone image decoding unit 1605 decodes the input encoded data of the four sub-blocks, generates image data for the one block, i.e., image data of 16×16 pixels, and outputs that data to the image block generation unit 1606.

In contrast, when the identification bit is "0", it means that the encoded data of the block has the structure shown in FIG. 12B. Accordingly, the analysis and separation unit 1602 distributes the encoded data stored in the encoded data buffer 1601 only to the halftone image decoding unit 1605. At this time, the analysis and separation unit 1602 also outputs the identification bit information to the image block generation unit 1606. The halftone image decoding unit 1605 decodes the input encoded data of the four sub-blocks, generates image data for the one block, i.e., image data of 16×16 pixels, and outputs that data to the image block generation unit 1606.

When the identification bit received from the analysis and separation unit 1602 is "0", the image data of the 16×16 pixel block output from the halftone image decoding unit 1605 is output as it is by the image block generation unit 1606.

When the identification bit received from the analysis and separation unit 1602 is "1", for pixels for which the identification information is "0", the image block generation unit 1606 outputs the pixel data that is output from the halftone image decoding unit 1605. Further, for pixels for which the identification information is "1", the image block generation unit 1606 outputs in sequential order the pixel data that is decoded at the acquisition color information decoding unit 1603.

As described above, according to the present third embodiment it is assumed that an acquisition color region is included in each sub-block included in one block, and that the DC component of the immediately preceding sub-block falls between the maximum value and minimum value of a non-acquisition color region in the sub-block of interest. In this case, according to the present third embodiment, a substitution value for pixel values in an acquisition color region in the sub-block of interest is determined so that the quantization representative value of the sub-block of interest matches the quantization representative value of the immediately preceding sub-block. As a result, high frequency components are reduced for halftone pixel values in each sub-block and, further, it is possible to make the difference between the direct current components of the sub-block of interest and the immediately preceding sub-block zero. More specifically, it is possible to suppress the occurrence of distortion with respect to the sub-blocks and to reduce the encoded amount to be generated.

In contrast, when the DC component of the immediately preceding sub-block is not between the maximum value and minimum value of the non-acquisition color region in the sub-block of interest, the substitution value for pixel values in an acquisition color region in the sub-block of interest is determined so that it matches the quantization representative value of the sub-block of interest itself. As a result, although the difference between the direct current components of the sub-blocks does not become zero, high frequency components in halftone pixel values in the sub-block of interest are reduced, the occurrence of sub-block distortion is suppressed, and the encoded amount to be generated can also be decreased.

Although the above third embodiment describes a case in which the post-quantization values of DC components of consecutive sub-blocks are made to match as much as possible, the present invention is not limited thereto, and a configuration may be adopted in which differential values after quantization of DC components of consecutive sub-blocks are reduced as much as possible. In this case, the substitution candidate value calculation unit 1104 generates a set of a remainder value and a plurality of candidate values from quantization representative values that are positioned between a quantization representative value of the immediately preceding sub-block and a quantization representative value generated at the quantization representative value generation unit 1103. It then selects a value among candidate values that satisfy inequality (11) that is closest to the quantization representative value of the immediately preceding block. According to this configuration it is possible to minimize the encoded amount of DC components while suppressing the encoded amount of AC components.

The first to third embodiments according to the present invention were described above, and the functions of the configurations according to FIG. 9, FIG. 13, FIG. 18, and FIG. 21 may also be implemented by a processor such as a CPU or an MPU executing a computer program. That is, the scope of the present invention also includes a computer program. Further, a computer program is normally stored on a computer-readable medium such as a CD-ROM. The computer program can then be executed by placing the computer readable medium in a reading apparatus (CD-ROM drive) and copying or installing the computer program into a system. Accordingly, it will be readily understood that this type of computer readable medium is also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-286883 filed on Oct. 20, 2006 and Japanese Patent Application No. 2006-286885 filed on Oct. 20, 2006 which are hereby incorporated by reference herein in their entirety.

What is claimed is:

1. The image encoding apparatus, that encodes image data in which character and/or line image data and halftone image data are mixed, comprising:

an input unit that inputs image data as an encoding object in block units consisting of a plurality of pixels;

an acquisition unit that acquires pixel data of a character and/or line image and identification information for identifying whether pixel data is pixel data of a character and/or line image or pixel data of a halftone attribute from image data of a block that is input;

a first encoding unit comprising a processor that encodes the character and/or line image data that is acquired by said acquisition unit;

a second encoding unit that encodes the identification information that is acquired by said acquisition unit;

a substitution unit that substitutes pixel data that is acquired as a character and/or line image in image data of the block that is input with a substitution value that is determined based on pixel data having a halftone attribute;

a third encoding unit that subjects image data in a block unit after substitution by said substitution unit to frequency conversion, and encodes resulting data; and a code stream generation unit that synthesizes encoded data that is generated by said first to third encoding units to generate encoded data in a block unit, wherein said substitution unit determines as the substitution value a value that is approximate to a direct-current component value after the frequency conversion in a case in which said substitution unit assumes the block that is input possesses only pixels with a halftone attribute, wherein said first and second encoding units are lossless encoding units and said third encoding unit is a lossy JPEG encoding unit, and wherein when a number of pixels having a character and/or line image attribute in one block is taken as N, and a sum total and an average of pixel data having a halftone attribute are taken as D and $D_{ave}$, respectively, a direct current component DC that said substitution unit calculates at a time of a DCT transformation operation is determined by the following formula:

$$DC=(D+D_{ave}\times N-128\times 64)/8,$$

and, when a value $D_p$ that is an integral multiple of a quantization step Q used when quantizing a direct current component at said third encoding unit and that is approximate to the direct current component DC that is calculated is defined, the substitution value Z is determined according to the following formula: character and/or line $$Z=(8\times D_p-D+128\times 64)/N.$$

2. The image encoding apparatus according to claim 1, wherein said substitution unit further determines a remainder value R that is produced when determining the substitution value Z, according to the following formula:

$$R=(8\times D_p-D+128\times 64)\ \%\ N,$$

A % B being a function that returns a surplus when an integer A is divided by an integer B, substitutes data of "N−R" pixels that are judged as being the character and/or line image with the substitution value Z, and substitutes data of R pixels that are judged as being the character and/or line image with "Z+1".

3. The image encoding apparatus according to claim 2, wherein a pixel position that is substituted with the "Z+1" is a pixel position near to a pixel having a halftone attribute with a large value.

4. A control method of an image encoding apparatus that encodes image data in which character and/or line image data and halftone image data are mixed, comprising:

an input step of inputting image data as an encoding object in block units consisting of a plurality of pixels;

an acquisition step of acquiring pixel data of a character and/or line image and identification information for identifying whether pixel data is pixel data of a character and/or line image or pixel data of a halftone attribute from image data of a block that is input;

a first encoding step, performed by a processor, of encoding the character and/or line image pixel data that is acquired at said acquisition step;

a second encoding step of encoding the identification information that is acquired at said acquisition step;

a substitution step of substituting pixel data that is acquired as a character and/or line image in image data of the block that is input with a substitution value that is determined based on pixel data having a halftone attribute;

a third encoding step of subjecting image data in a block unit after substitution at said substitution step to frequency conversion, and encoding resulting data; and a code stream generation step of synthesizing encoded data that is generated at said first to third encoding steps to generate encoded data in a block unit;

wherein said substitution step determines as the substitution value a value that is approximate to a direct-current component value after the frequency conversion in a case in which said substitution unit assumes the block that is input possesses only pixels with a halftone attribute, wherein said first and second encoding steps are lossless encoding steps and said third encoding step is a lossy JPEG encoding step, and wherein when a number of pixels having a character and/or line image attribute in one block is taken as N, and a sum total and an average of pixel data having a halftone attribute are taken as D and $D_{ave}$, respectively, a direct current component DC that said substitution step calculates at a time of a DCT transformation operation is determined by the following formula:

$$DC=(D+D_{ave}\times N-128\times 64)/8,$$

and, when a value $D_p$ that is an integral multiple of a quantization step Q used when quantizing a direct current component at said third encoding step and that is approximate to the direct current component DC that is calculated is defined, the substitution value Z is determined according to the following formula:

$$Z=(8\times D_p-D+128\times 64)/N.$$

5. A non-transitory computer readable storage medium storing a computer program thereon, wherein when a computer reads and executes said computer program, said computer program causes the computer to function as an image encoding apparatus according to claim 1.

6. An image encoding apparatus that encodes image data in which character and/or line image data and halftone image data are mixed, comprising:

an input unit that inputs image data in units of blocks that consist of a plurality of pixels;

an acquisition unit that acquires pixel data of a character and/or line image and identification information for identifying whether pixel data is pixel data of a character/line image or pixel data of a halftone attribute from image data of a block that is input;

a first encoding unit comprising a processor that encodes the character and/or line image pixel data that is acquired by said acquisition unit;

a second encoding unit that encodes the identification information that is acquired by said acquisition unit;

a substitution unit that, with respect to respective sub-blocks that are units for which discrete cosine transformation is performed that are included in a block that is input by said input unit, substitutes pixel data that is acquired as a character and/or line image of a sub-block of interest with a substitution value that is determined based on pixel data having a halftone attribute;

a third encoding unit that subjects image data of each sub-block after substitution by said substitution unit to discrete cosine transformation, and encodes resulting data; and a code stream generation unit that synthesizes encoded data that is generated by said first to third encoding units to generate encoded data in a block unit;

wherein said substitution unit comprises:

a direct current component calculation unit that calculates a direct current component in a case in which said substitution unit assumes a sub-block of interest consists of only pixels with a halftone attribute;

a judgment unit that judges whether or not a substitution candidate value that is determined based on a direct-current component value of an immediately preceding sub-block is within a range of values of pixels having a halftone attribute in a sub-block of interest; and a decision unit that, when said judgment unit judges that the substitution candidate value is within the range, decides as the substitution value a value at which a direct-current component value of a sub-block of interest is approximate to a direct-current component value of the immediately preceding sub-block, and when said judgment unit judges that the substitution candidate value is outside the range, decides as the substitution value a value which is made approximate to a direct-current component value of the sub-block of interest in a case in which said judgment unit assumes the sub-block of interest possesses only pixels with a halftone attribute.

7. The image encoding apparatus according to claim 6, wherein said first and second encoding units are lossless encoding units and said third encoding unit is a lossy JPEG encoding unit, and wherein when a number of pixels having a character and/or line image attribute in one sub-block is taken as N, and a sum total of pixel data having a halftone attribute and an average thereof are taken as D and $D_{ave}$, respectively, said direct current component calculation unit determines a direct current component DC that is calculated at a time of DCT transformation by the following formula:

$$DC=(D+D_{ave}\times N-128\times 64)/8$$

and, when a direct current component of an immediately preceding sub-block is taken as $DC_{-1}$ and a direct current component of a sub-block of interest is taken as $DC_0$, and the substitution value Z for a sub-block of interest is determined according to either of the following formulas:

$$Z=(8\times D_{p-1}-D+128\times 64)/N$$

or $$Z=(8\times D_{p0}D+128\times 64)/N.$$

8. The image encoding apparatus according to claim 7, wherein said substitution unit further determines according to either of the following formulas a remainder value R that occurs when determining said substitution value Z:

$$R=(8\times D_{p-1}-D+128\times 64)\ \%\ N$$

or $$R=(8\times D_{p0}-D+128\times 64)\ \%\ N,$$

A % B being a function that returns a surplus when an integer A is divided by an integer B, substitutes data of "N−R" pixels that are judged as being the character and/or line image with substitution value Z, and substitutes data of R pixels that are judged as being the character and/or line image with "Z+1".

9. The image encoding apparatus according to claim 6, wherein when a sub-block of interest is the leading sub-block of one block, said decision unit takes as the substitution value a value that is approximate to a direct-current component value in a case in which the decision unit assumes the sub-block of interest possesses only pixels with a halftone attribute.

10. A control method of an image encoding apparatus that encodes image data in which character and/or line image data and halftone image data are mixed, comprising:

an input step of inputting image data in units of blocks consisting of a plurality of pixels;

an acquisition step of acquiring pixel data of a character and/or line image and identification information for identifying whether pixel data is pixel data of a character and/or line image or pixel data of a halftone attribute from image data of a block that is input;

a first encoding step of encoding the character and/or line image pixel data that is acquired in said acquisition step;

a second encoding step of encoding the identification information that is acquired in said acquisition step;

a substitution step of substituting, with respect to respective sub-blocks that are units for which discrete cosine transformation is performed that are included in a block that is input at said input step, pixel data that is acquired as a character and/or line image in image data in a sub-block of interest with a substitution value that is determined based on pixel data having a halftone attribute;

a third encoding step of subjecting image data of each sub-block after substitution at said substitution step to discrete cosine transformation, and encoding resulting data; and a code stream generation step of synthesizing encoded data that is generated at said first to third encoding steps to generate encoded data in a block unit;

wherein said substitution step comprises:

a direct current component calculation step of calculating a direct current component in a case in which said substitution unit assumes a sub-block of interest consists of only pixels possessing a halftone attribute;

a judgment step of judging whether or not a substitution candidate value that is determined based on a direct-current component value of an immediately preceding sub-block is within a range of values of pixels having a halftone attribute in a sub-block of interest; and a decision step of, when it is judged at said judgment step that the substitution candidate value is within the range, deciding as the substitution value a value at which a direct-current component value of a sub-block of interest is approximate to a direct-current component value of the immediately preceding sub-block, and when it is judged at said judgment step that the substitution candidate value is outside the range, deciding as the substitution value a value which is made approximate to a direct-current component value of the sub-block of interest in a case in which it is assumed the sub-block of interest possesses only pixels with a halftone attribute.

11. A non-transitory, computer-readable storage medium storing a computer program thereon, wherein when a computer reads and executes said computer program, said computer program causes the computer to function as an image encoding apparatus according to claim 6.

* * * * *